US007785074B2

(12) United States Patent
Novori et al.

(10) Patent No.: US 7,785,074 B2
(45) Date of Patent: Aug. 31, 2010

(54) ROTOR BLADE FOR A SECOND STAGE OF A COMPRESSOR

(75) Inventors: Alessio Novori, Florence (IT); Paolo Arinci, Borgo San Lorenzo (IT); Salvatore Lorusso, Florence (IT)

(73) Assignee: General Electric Company, Schenectady, NY (US)

( * ) Notice: Subject to any disclaimer, the term of this patent is extended or adjusted under 35 U.S.C. 154(b) by 734 days.

(21) Appl. No.: 11/675,969

(22) Filed: Feb. 16, 2007

(65) Prior Publication Data

US 2008/0044288 A1 Feb. 21, 2008

(30) Foreign Application Priority Data

Feb. 27, 2006 (IT) .......................... MI2006A0340

(51) Int. Cl.
*B64C 27/46* (2006.01)

(52) U.S. Cl. ................... 416/223 R; 416/228; 416/235; 416/241 R; 416/500

(58) Field of Classification Search ............. 416/223 R, 416/228, 235, 236 R, 241 R, 243, 500
See application file for complete search history.

(56) References Cited

U.S. PATENT DOCUMENTS

| | | | | |
|---|---|---|---|---|
| 3,012,709 | A * | 12/1961 | Schnell | 416/236 R |
| 3,193,185 | A * | 7/1965 | Erwin et al. | 415/193 |
| 3,653,110 | A * | 4/1972 | King et al. | 29/889.72 |
| 3,692,425 | A * | 9/1972 | Erwin | 415/181 |
| 3,706,512 | A * | 12/1972 | Strelshik | 416/236 R |
| 4,108,573 | A * | 8/1978 | Wagner | 416/236 A |
| 4,116,584 | A * | 9/1978 | Bammert et al. | 415/199.5 |
| 4,128,363 | A * | 12/1978 | Fujikake et al. | 416/236 A |
| 4,911,612 | A * | 3/1990 | Rodde et al. | 416/223 R |
| 4,927,331 | A * | 5/1990 | Vuillet | 416/238 |
| 5,181,678 | A * | 1/1993 | Widnall et al. | 244/219 |

(Continued)

FOREIGN PATENT DOCUMENTS

EP 0 732 505 9/1996

OTHER PUBLICATIONS

U.S. Appl. No. 11/090,300, filed Mar. 28, 2005, inventor: Michael Adelbert Sullivan et al, entitled: First and Second Stage Turbine Airfoil Shapes.

(Continued)

*Primary Examiner*—Igor Kershteyn
(74) *Attorney, Agent, or Firm*—Potomac Patent Group PLLC

(57) ABSTRACT

A blade of a rotor of a second stage of a compressor can be defined by coordinates of a discreet combination of points, in a Cartesian reference system (X, Y, Z), where the axis (Z) is a radial axis intersecting the central axis of the compressor. The blade has a profile which can be identified by a series of closed intersection curves between the profile itself and planes (X, Y) lying at distances (Z) from the central axis. The blade also has a non-linearly variable trend of decreasing maximum thickness defined by the closed curves, substantially parallel to a base portion of the blade itself, fixable to the rotor. The variable trend of maximum thickness is substantially situated midway up the blade and is suitable for shifting the natural resonance frequencies of the blade itself outside a functioning velocity range of the rotor.

20 Claims, 2 Drawing Sheets

U.S. PATENT DOCUMENTS

| | | | | |
|---|---|---|---|---|
| 5,312,696 | A * | 5/1994 | Beers et al. | 428/660 |
| 6,129,528 | A * | 10/2000 | Bradbury et al. | 417/423.1 |
| 6,450,770 | B1 | 9/2002 | Wang et al. | |
| 6,503,053 | B2 * | 1/2003 | Huebner | 415/191 |
| 6,558,122 | B1 | 5/2003 | Xu et al. | |
| 6,565,324 | B1 * | 5/2003 | Phillipsen et al. | 416/236 R |
| 6,685,434 | B1 | 2/2004 | Humanchuk et al. | |
| 6,779,977 | B2 | 8/2004 | Lagrange et al. | |
| 6,808,368 | B1 | 10/2004 | Tomberg et al. | |
| 6,832,897 | B2 | 12/2004 | Urban | |
| 6,881,038 | B1 | 4/2005 | Beddard et al. | |
| 7,112,043 | B2 | 9/2006 | Jarra | |
| 2005/0047915 | A1 | 3/2005 | Jarrah | |

OTHER PUBLICATIONS

U.S. Appl. No. 10/986,162, filed Nov. 12, 2004, inventor: Steven Eric Tomberg et al, entitled: Air Foil Shape for a Compressor Blade.

* cited by examiner

ROTOR BLADE FOR A SECOND STAGE OF A COMPRESSOR

BACKGROUND

1. Field of the Invention

The field of the present invention relates to a blade of a rotor of a second stage of a compressor.

More specifically, the invention relates to a blade of a rotor having a high aerodynamic efficiency of a second stage of a compressor.

2. Related Art

Compressors normally pressurize in their interior air removed from the outside.

The fluid penetrates the compressor through a series of inlet ducts.

In these channels, the gas has low pressure and low temperature characteristics, whereas as it passes through the compressor, the gas is compressed and its temperature increases.

In order to increase the efficiency, the compressor is normally divided into various stages, each of which has a rotor and a stator respectively equipped with a series of blades.

In recent years, technologically advanced compressors have been further improved, obtaining an increased improvement in efficiency, operating in particular on the aerodynamic conditions.

The geometric configuration of the blades in fact significantly influences the aerodynamic efficiency.

This depends on the fact that the geometric characteristics of the blade cause a distribution of the relative velocities in the fluid, consequently influencing the distribution of the limit layers along the walls and ultimately, losses due to friction.

In particular, in the case of rotor blades of a second stage of a compressor an extremely high efficiency is required, at the same time maintaining an appropriate aerodynamic and mechanical load.

What is needed is:

A blade of a rotor of a second stage of a compressor which avoids, or in any case reduces, resonance problems due to the stimulation of natural frequencies and at the same time allows a high aerodynamic efficiency;

A blade of a rotor of a second stage of a compressor which avoids or in any case reduces resonance problems due to the stimulation of natural frequencies and which allows a useful life of the blade itself; and A rotor of a second phase of a compressor which allows a high aerodynamic efficiency, and at the same time allows a high reliability of the compressor to be obtained with a consequent increase in the power of the turbine itself, with the same compressor dimensions.

SUMMARY

Embodiments of the present invention meet the needs referenced above and exhibit additional characteristics by providing a rotor blade of a second stage of a compressor.

Further characteristics of the invention are indicated in the subsequent claims.

BRIEF DESCRIPTION OF THE DRAWINGS

The characteristics and advantages of a rotor blade of a second stage of a compressor according to the present invention will appear more evident from the following illustrative and non-limiting description, referring to the enclosed schematic drawings in which.

DETAILED DESCRIPTION

Figure 2:
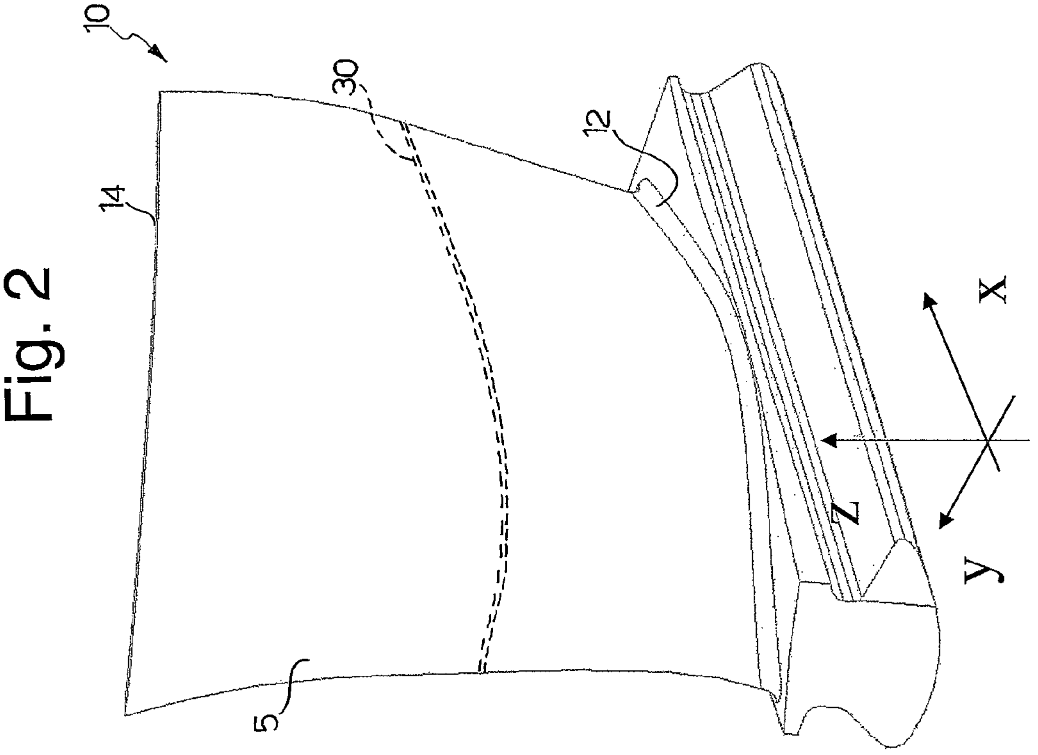
FIG. 2 is a raised view of the opposite side of the blade of FIG. 1.
Figure 1:
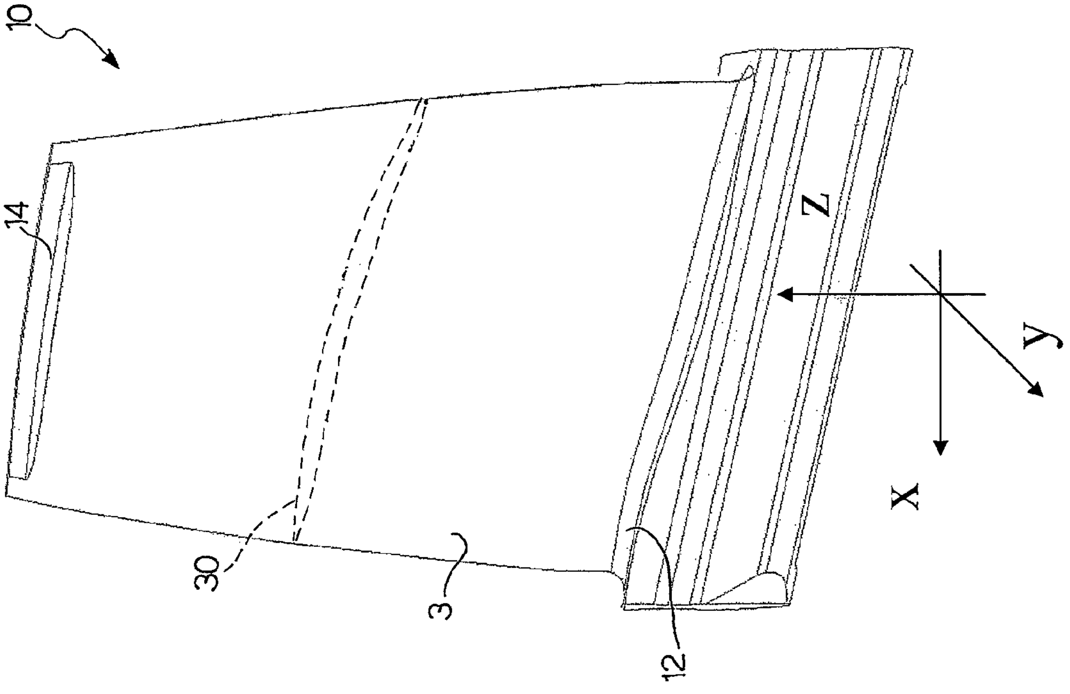
FIG. 1 is a raised view of a rotor blade of a compressor produced with an aerodynamic profile according to the present invention.

With reference to the figures, a blade 10 is provided of a rotor of a second stage of a compressor.

Said blade 10 is defined by means of coordinates of a discreet combination of points, in a Cartesian reference system (X,Y,Z), wherein the axis (Z) is a radial axis intersecting the central axis of the compressor, not shown.

The profile of the blade 10 is identified by means of a series of closed intersection curves between the profile itself and planes (X,Y) lying at distances (Z) from the central axis.

The profile of said blade 10 comprises a first substantially concave surface 3, which is pressurized, and a second substantially convex surface 5 which is in depression and opposite the first.

The two surfaces 3, 5 are continuous and joined to each other, and together form the profile of said blade 10.

At a base portion 12, commonly called "foot" of the blade 10, according to the known art there is a connecting joint with the aerodynamic profile of the blade 10 itself, said base portion 12 being suitable for being fixed to said rotor of said compressor.

Said blade 10 comprises a thickening 30, i.e. a prolonged portion having a greater thickness with respect to the adjacent portions, which is substantially parallel to said base portion 12 so as to shift the resonance frequencies of said blade 10 outside the functioning frequency range of the rotor itself, thus reducing or in any case avoiding problems of instability and vibrations of the blade 10 and rotor.

This advantageously leads to an increase in both the useful life and reliability of the rotor and compressor itself.

Said thickening 30 relates to at least one section or closed curve, and is also substantially situated midway up the blade 10.

In other words, said thickening 30 confers a dynamic behaviour to said blade 10 which is such as to have flexural frequencies which fall outside a functioning velocity range of the rotor of said compressor and consequently such that there is no intensification of the maximum flexural deformation of the blade during the functioning of the compressor.

This consequently leads to a higher performance of the compressor, of the rotor and a longer useful life of its components, as problems of resonance such as those described above are avoided.

The clearances and tolerances of the blade and stator can consequently be dimensioned so as to further increase the performances of the compressor itself.

This is possible as the blade, upon deforming, is prevented from causing a contact and relative friction against the relative stator.

In particular, each closed curve has a maximum thickness determined by the maximum distance between said first surface 3 and said second surface 5.

Figure 3:
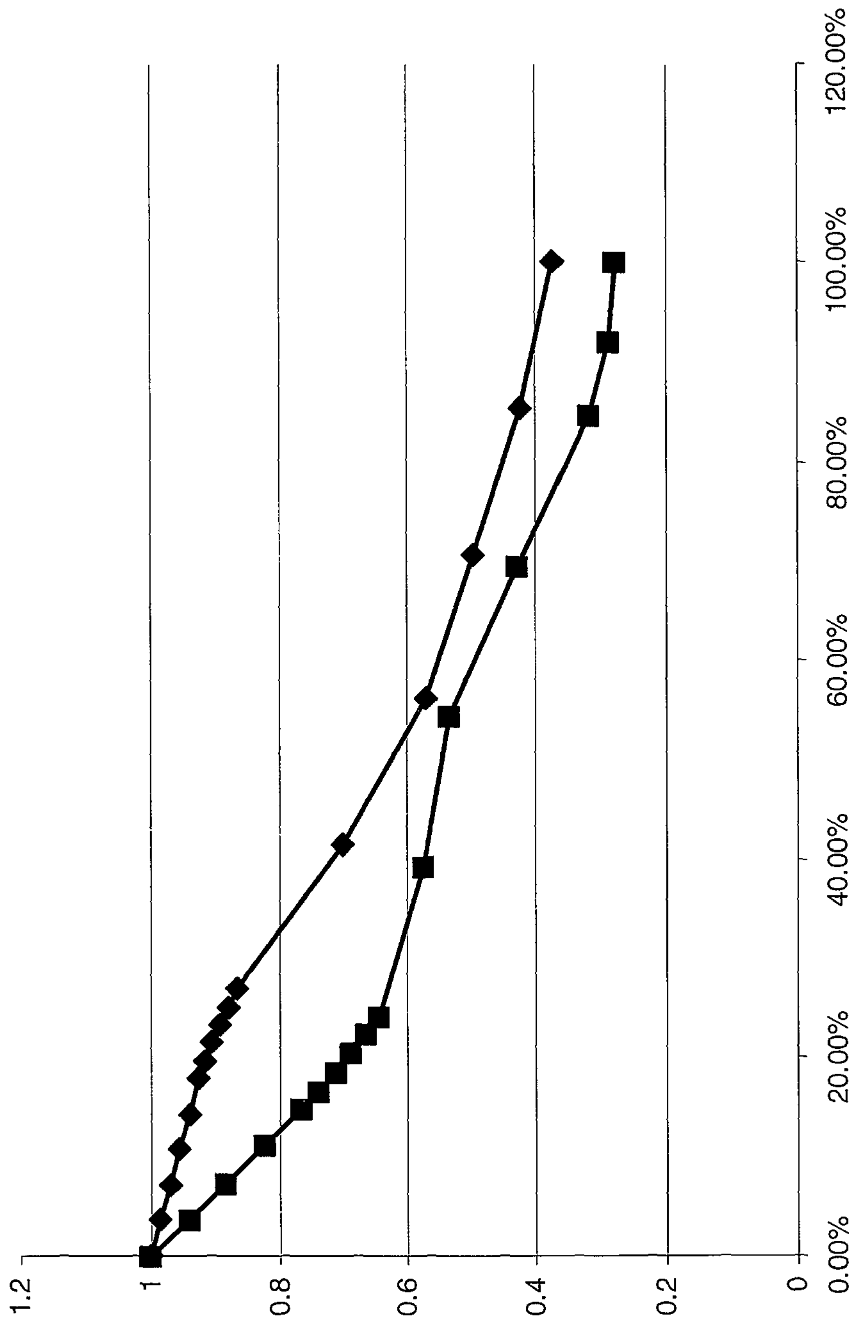
FIG. 3 is a diagram of the maximum thickness trend of a blade according to the present invention, with respect to its height.

Said maximum surface of each closed curve, along the height of the blade 10, moving towards a free end 14 of the blade 10, has a decreasing trend whose slope varies three times, defining four regions. For example, the variation in the trend of the maximum thickness is shown in FIG. 3, in which it is compared with the maximum thickness trend of a blade according to the known art. In particular, in FIG. 3, the abscissa indicates the height of the blade 10, wherein the ordinate represents the maximum thickness of the blade 10, adimensionalized by putting the thickness in correspondence with the foot of the blade equal to 1. In the diagram shown in FIG. 3, the upper line represents the maximum thickness trend of a blade according to the known art, whereas the lower line shows the trend of the maximum thickness of the blade according to the present invention.

Along the height of the blade 10 in the direction of a free end 14 of the blade 10, said maximum thickness preferably has a trend according to a polynomial function of the sixth degree and in particular said polynomial function is $$Tmax=-21.119*h^6+70.467*h^5-85.603*h^4+44.523*h^3-7.8323*h^2-1.1541*h+0.997$$

wherein h represents the percentage of the height of the blade 10, and wherein Tmax is the maximum adimensionalized thickness relating to the closed curve corresponding to that percentage of the height of the blade 10.

The profile of each blade 10 was also suitably shaped to be able to maintain the same efficiency at high levels.

The aerodynamic profile of each blade 10 is preferably defined by means of a series of closed curves whose coordinates are defined with respect to a Cartesian reference system X, Y, Z, wherein the axis Z is a radial axis intersecting the central axis of the turbine, and said closed curves lying at distances Z from the central axis are defined according to Table 1, whose values, expressed in millimeters, refer to an aerodynamic profile at room temperature, in particular 25° C.

TABLE I

| X | Y | Z |
|---|---|---|
| −32.517 | 32.876 | 230.276 |
| −32.501 | 32.886 | 230.276 |
| −32.466 | 32.898 | 230.276 |
| −32.392 | 32.903 | 230.276 |
| −32.249 | 32.868 | 230.276 |
| −32.039 | 32.773 | 230.276 |
| −31.685 | 32.561 | 230.276 |
| −31.241 | 32.234 | 230.276 |
| −30.677 | 31.764 | 230.276 |
| −29.982 | 31.164 | 230.276 |
| −29.084 | 30.379 | 230.276 |
| −28.056 | 29.463 | 230.276 |
| −26.970 | 28.476 | 230.276 |
| −25.756 | 27.357 | 230.276 |
| −24.412 | 26.106 | 230.276 |
| −22.940 | 24.725 | 230.276 |
| −21.407 | 23.274 | 230.276 |
| −19.816 | 21.752 | 230.276 |
| −18.164 | 20.161 | 230.276 |
| −16.447 | 18.505 | 230.276 |
| −14.664 | 16.784 | 230.276 |
| −12.813 | 15.003 | 230.276 |
| −10.890 | 13.163 | 230.276 |
| −8.894 | 11.268 | 230.276 |
| −6.886 | 9.385 | 230.276 |
| −4.864 | 7.518 | 230.276 |
| −2.823 | 5.670 | 230.276 |
| −0.759 | 3.847 | 230.276 |
| 1.327 | 2.052 | 230.276 |
| 3.436 | 0.19861 | 230.276 |
| 5.572 | −1.445 | 230.276 |
| 7.741 | −3.134 | 230.276 |
| 9.952 | −4.768 | 230.276 |
| 12.212 | −6.339 | 230.276 |
| 14.528 | −7.836 | 230.276 |
| 16.816 | −9.204 | 230.276 |
| 19.065 | −10.452 | 230.276 |
| 21.267 | −11.595 | 230.276 |

TABLE I-continued

| X | Y | Z |
|---|---|---|
| 23.415 | −12.647 | 230.276 |
| 25.500 | −13.615 | 230.276 |
| 27.518 | −14.510 | 230.276 |
| 29.464 | −15.340 | 230.276 |
| 31.249 | −16.077 | 230.276 |
| 32.869 | −16.731 | 230.276 |
| 34.322 | −17.310 | 230.276 |
| 35.604 | −17.818 | 230.276 |
| 36.717 | −18.256 | 230.276 |
| 37.658 | −18.626 | 230.276 |
| 38.462 | −18.946 | 230.276 |
| 39.135 | −19.219 | 230.276 |
| 39.688 | −19.446 | 230.276 |
| 40.130 | −19.629 | 230.276 |
| 40.469 | −19.771 | 230.276 |
| 40.723 | −19.878 | 230.276 |
| 40.900 | −20.024 | 230.276 |
| 40.972 | −20.196 | 230.276 |
| 40.974 | −20.337 | 230.276 |
| 40.927 | −20.475 | 230.276 |
| 40.798 | −20.620 | 230.276 |
| 40.567 | −20.693 | 230.276 |
| 40.271 | −20.713 | 230.276 |
| 39.877 | −20.737 | 230.276 |
| 39.363 | −20.764 | 230.276 |
| 38.722 | −20.793 | 230.276 |
| 37.941 | −20.822 | 230.276 |
| 37.012 | −20.849 | 230.276 |
| 35.926 | −20.871 | 230.276 |
| 34.642 | −20.885 | 230.276 |
| 33.160 | −20.882 | 230.276 |
| 31.482 | −20.846 | 230.276 |
| 29.607 | −20.760 | 230.276 |
| 27.538 | −20.601 | 230.276 |
| 25.290 | −20.348 | 230.276 |
| 22.967 | −19.991 | 230.276 |
| 20.570 | −19.516 | 230.276 |
| 18.104 | −18.909 | 230.276 |
| 15.573 | −18.154 | 230.276 |
| 12.979 | −17.233 | 230.276 |
| 10.333 | −16.134 | 230.276 |
| 7.676 | −14.853 | 230.276 |
| 5.106 | −13.432 | 230.276 |
| 2.621 | −11.879 | 230.276 |
| 0.14583 | −10.207 | 230.276 |
| −2.134 | −8.429 | 230.276 |
| −4.417 | −6.555 | 230.276 |
| −6.626 | −4.601 | 230.276 |
| −8.756 | −2.579 | 230.276 |
| −10.809 | −0.493 | 230.276 |
| −12.787 | 1.657 | 230.276 |
| −14.694 | 3.867 | 230.276 |
| −16.534 | 6.134 | 230.276 |
| −18.254 | 8.374 | 230.276 |
| −19.866 | 10.579 | 230.276 |
| −21.378 | 12.741 | 230.276 |
| −22.797 | 14.854 | 230.276 |
| −24.130 | 16.912 | 230.276 |
| −25.380 | 18.908 | 230.276 |
| −26.547 | 20.840 | 230.276 |
| −27.636 | 22.706 | 230.276 |
| −28.605 | 24.412 | 230.276 |
| −29.461 | 25.958 | 230.276 |
| −30.203 | 27.342 | 230.276 |
| −30.879 | 28.650 | 230.276 |
| −31.447 | 29.793 | 230.276 |
| −31.874 | 30.677 | 230.276 |
| −32.205 | 31.389 | 230.276 |
| −32.423 | 31.936 | 230.276 |
| −32.547 | 32.360 | 230.276 |
| −32.587 | 32.602 | 230.276 |
| −32.583 | 32.758 | 230.276 |
| −32.557 | 32.832 | 230.276 |
| −32.532 | 32.863 | 230.276 |
| −32.587 | 31.887 | 235.273 |
| −32.571 | 31.897 | 235.273 |
| −32.536 | 31.910 | 235.273 |

TABLE I-continued

| X | Y | Z |
|---|---|---|
| −32.462 | 31.913 | 235.273 |
| −32.320 | 31.877 | 235.273 |
| −32.113 | 31.778 | 235.273 |
| −31.763 | 31.560 | 235.273 |
| −31.324 | 31.231 | 235.273 |
| −30.763 | 30.762 | 235.273 |
| −30.071 | 30.163 | 235.273 |
| −29.179 | 29.378 | 235.273 |
| −28.157 | 28.463 | 235.273 |
| −27.073 | 27.480 | 235.273 |
| −25.860 | 26.368 | 235.273 |
| −24.517 | 25.127 | 235.273 |
| −23.041 | 23.759 | 235.273 |
| −21.502 | 22.327 | 235.273 |
| −19.899 | 20.828 | 235.273 |
| −18.230 | 19.265 | 235.273 |
| −16.493 | 17.642 | 235.273 |
| −14.686 | 15.959 | 235.273 |
| −12.808 | 14.219 | 235.273 |
| −10.857 | 12.423 | 235.273 |
| −8.830 | 10.575 | 235.273 |
| −6.793 | 8.737 | 235.273 |
| −4.744 | 6.914 | 235.273 |
| −2.680 | 5.107 | 235.273 |
| −0.598 | 3.321 | 235.273 |
| 1.506 | 1.562 | 235.273 |
| 3.634 | −0.166 | 235.273 |
| 5.789 | −1.860 | 235.273 |
| 7.976 | −3.512 | 235.273 |
| 10.202 | −5.116 | 235.273 |
| 12.468 | −6.663 | 235.273 |
| 14.774 | −8.140 | 235.273 |
| 17.044 | −9.496 | 235.273 |
| 19.272 | −10.741 | 235.273 |
| 21.453 | −11.886 | 235.273 |
| 23.579 | −12.941 | 235.273 |
| 25.646 | −13.916 | 235.273 |
| 27.646 | −14.820 | 235.273 |
| 29.575 | −15.659 | 235.273 |
| 31.344 | −16.407 | 235.273 |
| 32.950 | −17.070 | 235.273 |
| 34.389 | −17.658 | 235.273 |
| 35.661 | −18.173 | 235.273 |
| 36.764 | −18.616 | 235.273 |
| 37.698 | −18.991 | 235.273 |
| 38.494 | −19.314 | 235.273 |
| 39.163 | −19.588 | 235.273 |
| 39.712 | −19.816 | 235.273 |
| 40.150 | −20.000 | 235.273 |
| 40.487 | −20.143 | 235.273 |
| 40.739 | −20.251 | 235.273 |
| 40.914 | −20.398 | 235.273 |
| 40.983 | −20.569 | 235.273 |
| 40.983 | −20.709 | 235.273 |
| 40.935 | −20.846 | 235.273 |
| 40.805 | −20.988 | 235.273 |
| 40.577 | −21.058 | 235.273 |
| 40.284 | −21.072 | 235.273 |
| 39.893 | −21.088 | 235.273 |
| 39.384 | −21.105 | 235.273 |
| 38.749 | −21.121 | 235.273 |
| 37.976 | −21.135 | 235.273 |
| 37.057 | −21.142 | 235.273 |
| 35.981 | −21.140 | 235.273 |
| 34.711 | −21.125 | 235.273 |
| 33.246 | −21.088 | 235.273 |
| 31.586 | −21.014 | 235.273 |
| 29.733 | −20.885 | 235.273 |
| 27.690 | −20.680 | 235.273 |
| 25.473 | −20.377 | 235.273 |
| 23.183 | −19.970 | 235.273 |
| 20.824 | −19.443 | 235.273 |
| 18.399 | −18.782 | 235.273 |
| 15.913 | −17.971 | 235.273 |
| 13.369 | −16.996 | 235.273 |
| 10.776 | −15.850 | 235.273 |
| 8.172 | −14.538 | 235.273 |

TABLE I-continued

| X | Y | Z |
|---|---|---|
| 5.647 | −13.107 | 235.273 |
| 3.196 | −11.567 | 235.273 |
| 0.56458 | −9.922 | 235.273 |
| −1.507 | −8.186 | 235.273 |
| −3.767 | −6.360 | 235.273 |
| −5.971 | −4.449 | 235.273 |
| −8.113 | −2.464 | 235.273 |
| −10.185 | −0.421 | 235.273 |
| −12.189 | 1.674 | 235.273 |
| −14.128 | 3.820 | 235.273 |
| −16.008 | 6.013 | 235.273 |
| −17.770 | 8.175 | 235.273 |
| −19.424 | 10.300 | 235.273 |
| −20.976 | 12.383 | 235.273 |
| −22.434 | 14.418 | 235.273 |
| −23.802 | 16.400 | 235.273 |
| −25.085 | 18.327 | 235.273 |
| −26.287 | 20.196 | 235.273 |
| −27.412 | 22.002 | 235.273 |
| −28.418 | 23.658 | 235.273 |
| −29.308 | 25.160 | 235.273 |
| −30.083 | 26.506 | 235.273 |
| −30.795 | 27.775 | 235.273 |
| −31.399 | 28.884 | 235.273 |
| −31.854 | 29.741 | 235.273 |
| −32.206 | 30.433 | 235.273 |
| −32.444 | 30.964 | 235.273 |
| −32.588 | 31.376 | 235.273 |
| −32.642 | 31.613 | 235.273 |
| −32.646 | 31.768 | 235.273 |
| −32.624 | 31.842 | 235.273 |
| −32.601 | 31.874 | 235.273 |
| −32.636 | 30.926 | 241.239 |
| −32.621 | 30.936 | 241.239 |
| −32.586 | 30.948 | 241.239 |
| −32.512 | 30.950 | 241.239 |
| −32.371 | 30.908 | 241.239 |
| −32.170 | 30.803 | 241.239 |
| −31.829 | 30.575 | 241.239 |
| −31.396 | 30.241 | 241.239 |
| −30.840 | 29.772 | 241.239 |
| −30.154 | 29.172 | 241.239 |
| −29.271 | 28.384 | 241.239 |
| −28.257 | 27.469 | 241.239 |
| −27.177 | 26.491 | 241.239 |
| −25.965 | 25.387 | 241.239 |
| −24.621 | 24.159 | 241.239 |
| −23.141 | 22.808 | 241.239 |
| −21.593 | 21.397 | 241.239 |
| −19.978 | 19.925 | 241.239 |
| −18.294 | 18.392 | 241.239 |
| −16.541 | 16.801 | 241.239 |
| −14.716 | 15.154 | 241.239 |
| −12.818 | 13.451 | 241.239 |
| −10.846 | 11.694 | 241.239 |
| −8.799 | 9.887 | 241.239 |
| −6.742 | 8.090 | 241.239 |
| −4.675 | 6.306 | 241.239 |
| −2.594 | 4.538 | 241.239 |
| −0.498 | 2.789 | 241.239 |
| 1.619 | 1.065 | 241.239 |
| 3.762 | −0.629 | 241.239 |
| 5.933 | −2.287 | 241.239 |
| 8.137 | −3.906 | 241.239 |
| 10.373 | −5.480 | 241.239 |
| 12.641 | −7.005 | 241.239 |
| 14.943 | −8.475 | 241.239 |
| 17.205 | −9.839 | 241.239 |
| 19.424 | −11.102 | 241.239 |
| 21.594 | −12.267 | 241.239 |
| 23.709 | −13.339 | 241.239 |
| 25.764 | −14.328 | 241.239 |
| 27.753 | −15.243 | 241.239 |
| 29.669 | −16.096 | 241.239 |
| 31.427 | −16.857 | 241.239 |
| 33.023 | −17.535 | 241.239 |
| 34.453 | −18.134 | 241.239 |

TABLE I-continued

| X | Y | Z |
|---|---|---|
| 35.717 | −18.659 | 241.239 |
| 36.814 | −19.111 | 241.239 |
| 37.742 | −19.492 | 241.239 |
| 38.535 | −19.819 | 241.239 |
| 39.200 | −20.096 | 241.239 |
| 39.747 | −20.326 | 241.239 |
| 40.183 | −20.512 | 241.239 |
| 40.518 | −20.656 | 241.239 |
| 40.769 | −20.766 | 241.239 |
| 40.937 | −20.915 | 241.239 |
| 40.999 | −21.084 | 241.239 |
| 40.996 | −21.220 | 241.239 |
| 40.946 | −21.354 | 241.239 |
| 40.816 | −21.492 | 241.239 |
| 40.591 | −21.560 | 241.239 |
| 40.302 | −21.566 | 241.239 |
| 39.916 | −21.573 | 241.239 |
| 39.415 | −21.577 | 241.239 |
| 38.788 | −21.578 | 241.239 |
| 38.027 | −21.571 | 241.239 |
| 37.121 | −21.553 | 241.239 |
| 36.061 | −21.520 | 241.239 |
| 34.810 | −21.467 | 241.239 |
| 33.368 | −21.386 | 241.239 |
| 31.736 | −21.260 | 241.239 |
| 29.915 | −21.071 | 241.239 |
| 27.910 | −20.798 | 241.239 |
| 25.738 | −20.417 | 241.239 |
| 23.500 | −19.924 | 241.239 |
| 21.197 | −19.311 | 241.239 |
| 18.834 | −18.569 | 241.239 |
| 16.412 | −17.690 | 241.239 |
| 13.932 | −16.667 | 241.239 |
| 11.403 | −15.494 | 241.239 |
| 8.852 | −14.175 | 241.239 |
| 6.369 | −12.758 | 241.239 |
| 3.951 | −11.247 | 241.239 |
| 1.595 | −9.647 | 241.239 |
| −0.701 | −7.961 | 241.239 |
| −2.939 | −6.192 | 241.239 |
| −5.123 | −4.345 | 241.239 |
| −7.257 | −2.425 | 241.239 |
| −9.341 | −0.441 | 241.239 |
| −11.372 | 1.594 | 241.239 |
| −13.352 | 3.678 | 241.239 |
| −15.283 | 5.808 | 241.239 |
| −17.104 | 7.909 | 241.239 |
| −18.820 | 9.975 | 241.239 |
| −20.435 | 11.999 | 241.239 |
| −21.954 | 13.976 | 241.239 |
| −23.382 | 15.903 | 241.239 |
| −24.722 | 17.776 | 241.239 |
| −25.978 | 19.589 | 241.239 |
| −27.155 | 21.341 | 241.239 |
| −28.206 | 22.946 | 241.239 |
| −29.135 | 24.402 | 241.239 |
| −29.947 | 25.705 | 241.239 |
| −30.695 | 26.934 | 241.239 |
| −31.333 | 28.006 | 241.239 |
| −31.812 | 28.837 | 241.239 |
| −32.183 | 29.509 | 241.239 |
| −32.440 | 30.024 | 241.239 |
| −32.605 | 30.423 | 241.239 |
| −32.673 | 30.653 | 241.239 |
| −32.687 | 30.805 | 241.239 |
| −32.670 | 30.880 | 241.239 |
| −32.650 | 30.912 | 241.239 |
| −32.605 | 30.688 | 244.222 |
| −32.590 | 30.698 | 244.222 |
| −32.555 | 30.710 | 244.222 |
| −32.482 | 30.710 | 244.222 |
| −32.342 | 30.665 | 244.222 |
| −32.143 | 30.555 | 244.222 |
| −31.807 | 30.318 | 244.222 |
| −31.381 | 29.977 | 244.222 |
| −30.830 | 29.500 | 244.222 |
| −30.150 | 28.892 | 244.222 |

TABLE I-continued

| X | Y | Z |
|---|---|---|
| −29.274 | 28.094 | 244.222 |
| −28.268 | 27.169 | 244.222 |
| −27.194 | 26.183 | 244.222 |
| −25.986 | 25.072 | 244.222 |
| −24.644 | 23.839 | 244.222 |
| −23.164 | 22.486 | 244.222 |
| −21.614 | 21.074 | 244.222 |
| −19.994 | 19.605 | 244.222 |
| −18.303 | 18.077 | 244.222 |
| −16.541 | 16.492 | 244.222 |
| −14.706 | 14.852 | 244.222 |
| −12.799 | 13.156 | 244.222 |
| −10.818 | 11.407 | 244.222 |
| −8.762 | 9.605 | 244.222 |
| −6.697 | 7.813 | 244.222 |
| −4.621 | 6.034 | 244.222 |
| −2.532 | 4.271 | 244.222 |
| −0.425 | 2.528 | 244.222 |
| 1.703 | 0.5625 | 244.222 |
| 3.856 | −0.875 | 244.222 |
| 6.034 | −2.522 | 244.222 |
| 8.240 | −4.128 | 244.222 |
| 10.476 | −5.691 | 244.222 |
| 12.743 | −7.208 | 244.222 |
| 15.042 | −8.677 | 244.222 |
| 17.298 | −10.048 | 244.222 |
| 19.508 | −11.324 | 244.222 |
| 21.669 | −12.509 | 244.222 |
| 23.772 | −13.608 | 244.222 |
| 25.814 | −14.626 | 244.222 |
| 27.791 | −15.570 | 244.222 |
| 29.697 | −16.448 | 244.222 |
| 31.448 | −17.229 | 244.222 |
| 33.038 | −17.921 | 244.222 |
| 34.465 | −18.531 | 244.222 |
| 35.726 | −19.064 | 244.222 |
| 36.821 | −19.520 | 244.222 |
| 37.749 | −19.904 | 244.222 |
| 38.542 | −20.232 | 244.222 |
| 39.208 | −20.509 | 244.222 |
| 39.755 | −20.739 | 244.222 |
| 40.192 | −20.924 | 244.222 |
| 40.527 | −21.067 | 244.222 |
| 40.779 | −21.176 | 244.222 |
| 40.950 | −21.324 | 244.222 |
| 41.011 | −21.497 | 244.222 |
| 41.006 | −21.635 | 244.222 |
| 40.955 | −21.768 | 244.222 |
| 40.825 | −21.905 | 244.222 |
| 40.600 | −21.974 | 244.222 |
| 40.312 | −21.977 | 244.222 |
| 39.928 | −21.979 | 244.222 |
| 39.428 | −21.977 | 244.222 |
| 38.804 | −21.968 | 244.222 |
| 38.045 | −21.948 | 244.222 |
| 37.143 | −21.912 | 244.222 |
| 36.089 | −21.854 | 244.222 |
| 34.844 | −21.769 | 244.222 |
| 33.411 | −21.645 | 244.222 |
| 31.791 | −21.468 | 244.222 |
| 29.985 | −21.219 | 244.222 |
| 27.996 | −20.879 | 244.222 |
| 25.842 | −20.431 | 244.222 |
| 23.621 | −19.881 | 244.222 |
| 21.337 | −19.220 | 244.222 |
| 18.992 | −18.437 | 244.222 |
| 16.590 | −17.527 | 244.222 |
| 14.134 | −16.479 | 244.222 |
| 11.625 | −15.286 | 244.222 |
| 9.085 | −13.951 | 244.222 |
| 6.612 | −12.525 | 244.222 |
| 4.202 | −11.012 | 244.222 |
| 1.853 | −9.415 | 244.222 |
| −0.436 | −7.738 | 244.222 |
| −2.669 | −5.983 | 244.222 |
| −4.847 | −4.154 | 244.222 |
| −6.976 | −2.257 | 244.222 |

TABLE I-continued

| X | Y | Z |
|---|---|---|
| −9.059 | −0.298 | 244.222 |
| −11.097 | 1.718 | 244.222 |
| −13.086 | 3.778 | 244.222 |
| −15.028 | 5.881 | 244.222 |
| −16.861 | 7.952 | 244.222 |
| −18.592 | 9.986 | 244.222 |
| −20.224 | 11.980 | 244.222 |
| −21.763 | 13.928 | 244.222 |
| −23.212 | 15.828 | 244.222 |
| −24.571 | 17.676 | 244.222 |
| −25.846 | 19.466 | 244.222 |
| −27.041 | 21.197 | 244.222 |
| −28.106 | 22.784 | 244.222 |
| −29.048 | 24.224 | 244.222 |
| −29.869 | 25.514 | 244.222 |
| −30.628 | 26.731 | 244.222 |
| −31.273 | 27.792 | 244.222 |
| −31.758 | 28.616 | 244.222 |
| −32.133 | 29.282 | 244.222 |
| −32.394 | 29.793 | 244.222 |
| −32.565 | 30.188 | 244.222 |
| −32.637 | 30.415 | 244.222 |
| −32.654 | 30.567 | 244.222 |
| −32.639 | 30.641 | 244.222 |
| −32.619 | 30.674 | 244.222 |
| −32.528 | 30.632 | 247.206 |
| −32.513 | 30.643 | 247.206 |
| −32.478 | 30.654 | 247.206 |
| −32.404 | 30.652 | 247.206 |
| −32.266 | 30.603 | 247.206 |
| −32.069 | 30.488 | 247.206 |
| −31.738 | 30.243 | 247.206 |
| −31.317 | 29.893 | 247.206 |
| −30.772 | 29.405 | 247.206 |
| −30.100 | 28.786 | 247.206 |
| −29.233 | 27.974 | 247.206 |
| −28.234 | 27.035 | 247.206 |
| −27.168 | 26.034 | 247.206 |
| −25.968 | 24.908 | 247.206 |
| −24.633 | 23.660 | 247.206 |
| −23.160 | 22.292 | 247.206 |
| −21.615 | 20.866 | 247.206 |
| −19.999 | 19.383 | 247.206 |
| −18.311 | 17.844 | 247.206 |
| −16.549 | 16.250 | 247.206 |
| −14.712 | 14.602 | 247.206 |
| −12.799 | 12.902 | 247.206 |
| −10.811 | 11.151 | 247.206 |
| −8.745 | 9.349 | 247.206 |
| −6.670 | 7.557 | 247.206 |
| −4.584 | 5.779 | 247.206 |
| −2.484 | 4.017 | 247.206 |
| −0.366 | 2.275 | 247.206 |
| 1.773 | 0.38958 | 247.206 |
| 3.935 | −1.120 | 247.206 |
| 6.125 | −2.764 | 247.206 |
| 8.342 | −4.369 | 247.206 |
| 10.588 | −5.934 | 247.206 |
| 12.864 | −7.458 | 247.206 |
| 15.171 | −8.937 | 247.206 |
| 17.432 | −10.323 | 247.206 |
| 19.641 | −11.616 | 247.206 |
| 21.795 | −12.821 | 247.206 |
| 23.890 | −13.942 | 247.206 |
| 25.924 | −14.987 | 247.206 |
| 27.891 | −15.962 | 247.206 |
| 29.787 | −16.872 | 247.206 |
| 31.527 | −17.686 | 247.206 |
| 33.106 | −18.410 | 247.206 |
| 34.523 | −19.050 | 247.206 |
| 35.776 | −19.609 | 247.206 |
| 36.864 | −20.088 | 247.206 |
| 37.786 | −20.489 | 247.206 |
| 38.575 | −20.832 | 247.206 |
| 39.237 | −21.121 | 247.206 |
| 39.781 | −21.360 | 247.206 |
| 40.216 | −21.553 | 247.206 |

TABLE I-continued

| X | Y | Z |
|---|---|---|
| 40.551 | −21.701 | 247.206 |
| 40.801 | −21.814 | 247.206 |
| 40.969 | −21.965 | 247.206 |
| 41.027 | −22.138 | 247.206 |
| 41.018 | −22.275 | 247.206 |
| 40.963 | −22.406 | 247.206 |
| 40.829 | −22.538 | 247.206 |
| 40.602 | −22.597 | 247.206 |
| 40.314 | −22.587 | 247.206 |
| 39.930 | −22.572 | 247.206 |
| 39.431 | −22.548 | 247.206 |
| 38.808 | −22.512 | 247.206 |
| 38.052 | −22.457 | 247.206 |
| 37.152 | −22.381 | 247.206 |
| 36.102 | −22.276 | 247.206 |
| 34.863 | −22.137 | 247.206 |
| 33.436 | −21.952 | 247.206 |
| 31.824 | −21.709 | 247.206 |
| 30.028 | −21.393 | 247.206 |
| 28.056 | −20.988 | 247.206 |
| 25.920 | −20.479 | 247.206 |
| 23.718 | −19.875 | 247.206 |
| 21.456 | −19.167 | 247.206 |
| 19.134 | −18.344 | 247.206 |
| 16.758 | −17.401 | 247.206 |
| 14.329 | −16.328 | 247.206 |
| 11.850 | −15.119 | 247.206 |
| 9.323 | −13.767 | 247.206 |
| 6.843 | −12.321 | 247.206 |
| 4.426 | −10.794 | 247.206 |
| 2.073 | −9.191 | 247.206 |
| −0.219 | −7.515 | 247.206 |
| −2.453 | −5.767 | 247.206 |
| −4.630 | −3.952 | 247.206 |
| −6.756 | −2.075 | 247.206 |
| −8.834 | −0.140 | 247.206 |
| −10.868 | 1.848 | 247.206 |
| −12.862 | 3.885 | 247.206 |
| −14.816 | 5.970 | 247.206 |
| −16.665 | 8.027 | 247.206 |
| −18.410 | 10.049 | 247.206 |
| −20.055 | 12.029 | 247.206 |
| −21.604 | 13.966 | 247.206 |
| −23.062 | 15.854 | 247.206 |
| −24.430 | 17.690 | 247.206 |
| −25.713 | 19.470 | 247.206 |
| −26.916 | 21.190 | 247.206 |
| −27.989 | 22.768 | 247.206 |
| −28.937 | 24.200 | 247.206 |
| −29.764 | 25.483 | 247.206 |
| −30.529 | 26.693 | 247.206 |
| −31.179 | 27.750 | 247.206 |
| −31.667 | 28.570 | 247.206 |
| −32.045 | 29.233 | 247.206 |
| −32.308 | 29.741 | 247.206 |
| −32.482 | 30.133 | 247.206 |
| −32.556 | 30.360 | 247.206 |
| −32.575 | 30.511 | 247.206 |
| −32.561 | 30.586 | 247.206 |
| −32.542 | 30.619 | 247.206 |
| −32.262 | 30.914 | 253.172 |
| −32.247 | 30.924 | 253.172 |
| −32.211 | 30.934 | 253.172 |
| −32.137 | 30.928 | 253.172 |
| −32.000 | 30.873 | 253.172 |
| −31.807 | 30.747 | 253.172 |
| −31.485 | 30.486 | 253.172 |
| −31.073 | 30.119 | 253.172 |
| −30.541 | 29.610 | 253.172 |
| −29.883 | 28.965 | 253.172 |
| −29.034 | 28.121 | 253.172 |
| −28.055 | 27.147 | 253.172 |
| −27.008 | 26.110 | 253.172 |
| −25.828 | 24.946 | 253.172 |
| −24.514 | 23.656 | 253.172 |
| −23.063 | 22.242 | 253.172 |
| −21.540 | 20.771 | 253.172 |

TABLE I-continued

| X | Y | Z |
|---|---|---|
| −19.946 | 19.241 | 253.172 |
| −18.278 | 17.654 | 253.172 |
| −16.537 | 16.012 | 253.172 |
| −14.718 | 14.317 | 253.172 |
| −12.819 | 12.574 | 253.172 |
| −10.837 | 10.783 | 253.172 |
| −8.772 | 8.949 | 253.172 |
| −6.692 | 7.133 | 253.172 |
| −4.596 | 5.334 | 253.172 |
| −2.485 | 3.554 | 253.172 |
| −0.355 | 1.795 | 253.172 |
| 1.797 | 0.063 | 253.172 |
| 3.974 | −1.635 | 253.172 |
| 6.177 | −3.298 | 253.172 |
| 8.408 | −4.923 | 253.172 |
| 10.666 | −6.510 | 253.172 |
| 12.950 | −8.061 | 253.172 |
| 15.262 | −9.573 | 253.172 |
| 17.521 | −10.996 | 253.172 |
| 19.723 | −12.333 | 253.172 |
| 21.867 | −13.588 | 253.172 |
| 23.950 | −14.765 | 253.172 |
| 25.969 | −15.869 | 253.172 |
| 27.921 | −16.906 | 253.172 |
| 29.802 | −17.880 | 253.172 |
| 31.527 | −18.753 | 253.172 |
| 33.094 | −19.532 | 253.172 |
| 34.500 | −20.222 | 253.172 |
| 35.743 | −20.825 | 253.172 |
| 36.823 | −21.341 | 253.172 |
| 37.738 | −21.775 | 253.172 |
| 38.521 | −22.144 | 253.172 |
| 39.179 | −22.455 | 253.172 |
| 39.720 | −22.712 | 253.172 |
| 40.152 | −22.919 | 253.172 |
| 40.484 | −23.079 | 253.172 |
| 40.732 | −23.199 | 253.172 |
| 40.899 | −23.353 | 253.172 |
| 40.952 | −23.530 | 253.172 |
| 40.936 | −23.667 | 253.172 |
| 40.872 | −23.794 | 253.172 |
| 40.728 | −23.916 | 253.172 |
| 40.496 | −23.953 | 253.172 |
| 40.210 | −23.919 | 253.172 |
| 39.829 | −23.872 | 253.172 |
| 39.333 | −23.806 | 253.172 |
| 38.715 | −23.717 | 253.172 |
| 37.965 | −23.600 | 253.172 |
| 37.075 | −23.451 | 253.172 |
| 36.035 | −23.264 | 253.172 |
| 34.809 | −23.030 | 253.172 |
| 33.399 | −22.740 | 253.172 |
| 31.806 | −22.385 | 253.172 |
| 30.033 | −21.952 | 253.172 |
| 28.088 | −21.428 | 253.172 |
| 25.982 | −20.800 | 253.172 |
| 23.811 | −20.086 | 253.172 |
| 21.578 | −19.276 | 253.172 |
| 19.287 | −18.364 | 253.172 |
| 16.941 | −17.343 | 253.172 |
| 14.543 | −16.205 | 253.172 |
| 12.096 | −14.945 | 253.172 |
| 9.603 | −13.556 | 253.172 |
| 7.148 | −12.082 | 253.172 |
| 4.732 | −10.523 | 253.172 |
| 2.373 | −8.894 | 253.172 |
| 0.077 | −7.198 | 253.172 |
| −2.160 | −5.439 | 253.172 |
| −4.340 | −3.619 | 253.172 |
| −6.468 | −1.743 | 253.172 |
| −8.548 | 0.12847 | 253.172 |
| −10.584 | 2.160 | 253.172 |
| −12.576 | 4.181 | 253.172 |
| −14.525 | 6.249 | 253.172 |
| −16.366 | 8.294 | 253.172 |
| −18.104 | 10.310 | 253.172 |
| −19.745 | 12.293 | 253.172 |
| −21.293 | 14.235 | 253.172 |
| −22.749 | 16.128 | 253.172 |
| −24.118 | 17.967 | 253.172 |
| −25.405 | 19.749 | 253.172 |
| −26.612 | 21.471 | 253.172 |
| −27.689 | 23.049 | 253.172 |
| −28.641 | 24.482 | 253.172 |
| −29.473 | 25.765 | 253.172 |
| −30.241 | 26.975 | 253.172 |
| −30.894 | 28.032 | 253.172 |
| −31.384 | 28.852 | 253.172 |
| −31.764 | 29.515 | 253.172 |
| −32.030 | 30.023 | 253.172 |
| −32.208 | 30.414 | 253.172 |
| −32.286 | 30.640 | 253.172 |
| −32.307 | 30.792 | 253.172 |
| −32.295 | 30.867 | 253.172 |
| −32.276 | 30.900 | 253.172 |
| −31.891 | 31.429 | 259.138 |
| −31.875 | 31.439 | 259.138 |
| −31.839 | 31.448 | 259.138 |
| −31.764 | 31.439 | 259.138 |
| −31.629 | 31.378 | 259.138 |
| −31.440 | 31.244 | 259.138 |
| −31.125 | 30.972 | 259.138 |
| −30.720 | 30.590 | 259.138 |
| −30.198 | 30.065 | 259.138 |
| −29.554 | 29.400 | 259.138 |
| −28.721 | 28.530 | 259.138 |
| −27.761 | 27.526 | 259.138 |
| −26.733 | 26.459 | 259.138 |
| −25.575 | 25.261 | 259.138 |
| −24.283 | 23.934 | 259.138 |
| −22.856 | 22.480 | 259.138 |
| −21.357 | 20.966 | 259.138 |
| −19.786 | 19.394 | 259.138 |
| −18.143 | 17.764 | 259.138 |
| −16.425 | 16.077 | 259.138 |
| −14.630 | 14.337 | 259.138 |
| −12.755 | 12.546 | 259.138 |
| −10.797 | 10.708 | 259.138 |
| −8.755 | 8.825 | 259.138 |
| −6.694 | 6.963 | 259.138 |
| −4.615 | 5.121 | 259.138 |
| −2.518 | 3.300 | 259.138 |
| −0.400 | 1.502 | 259.138 |
| 1.741 | −0.268 | 259.138 |
| 3.908 | −2.005 | 259.138 |
| 6.100 | −3.709 | 259.138 |
| 8.318 | −5.378 | 259.138 |
| 10.562 | −7.015 | 259.138 |
| 12.830 | −8.618 | 259.138 |
| 15.122 | −10.188 | 259.138 |
| 17.358 | −11.671 | 259.138 |
| 19.538 | −13.073 | 259.138 |
| 21.657 | −14.396 | 259.138 |
| 23.715 | −15.644 | 259.138 |
| 25.708 | −16.821 | 259.138 |
| 27.633 | −17.932 | 259.138 |
| 29.488 | −18.978 | 259.138 |
| 31.190 | −19.920 | 259.138 |
| 32.735 | −20.762 | 259.138 |
| 34.121 | −21.509 | 259.138 |
| 35.347 | −22.162 | 259.138 |
| 36.412 | −22.724 | 259.138 |
| 37.315 | −23.195 | 259.138 |
| 38.087 | −23.597 | 259.138 |
| 38.736 | −23.936 | 259.138 |
| 39.269 | −24.216 | 259.138 |
| 39.695 | −24.441 | 259.138 |
| 40.022 | −24.614 | 259.138 |
| 40.267 | −24.745 | 259.138 |
| 40.431 | −24.904 | 259.138 |
| 40.476 | −25.083 | 259.138 |
| 40.451 | −25.220 | 259.138 |
| 40.379 | −25.342 | 259.138 |
| 40.225 | −25.451 | 259.138 |

TABLE I-continued

| X | Y | Z |
|---|---|---|
| 39.991 | −25.466 | 259.138 |
| 39.708 | −25.408 | 259.138 |
| 39.332 | −25.328 | 259.138 |
| 38.844 | −25.221 | 259.138 |
| 38.235 | −25.082 | 259.138 |
| 37.496 | −25.906 | 259.138 |
| 36.620 | −24.688 | 259.138 |
| 35.597 | −24.423 | 259.138 |
| 34.390 | −24.099 | 259.138 |
| 33.003 | −23.711 | 259.138 |
| 31.437 | −23.248 | 259.138 |
| 29.695 | −22.701 | 259.138 |
| 27.785 | −22.061 | 259.138 |
| 25.716 | −21.315 | 259.138 |
| 23.582 | −20.488 | 259.138 |
| 21.387 | −19.574 | 259.138 |
| 19.134 | −18.566 | 259.138 |
| 16.826 | −17.457 | 259.138 |
| 14.467 | −16.242 | 259.138 |
| 12.060 | −14.913 | 259.138 |
| 9.608 | −13.465 | 259.138 |
| 7.194 | −11.943 | 259.138 |
| 4.819 | −10.347 | 259.138 |
| 2.481 | −8.678 | 259.138 |
| 0.13125 | −6.938 | 259.138 |
| −2.042 | −5.141 | 259.138 |
| −4.215 | −3.288 | 259.138 |
| −6.333 | −1.383 | 259.138 |
| −8.401 | 0.39514 | 259.138 |
| −10.421 | 2.565 | 259.138 |
| −12.395 | 4.606 | 259.138 |
| −14.322 | 6.690 | 259.138 |
| −16.141 | 8.747 | 259.138 |
| −17.856 | 10.771 | 259.138 |
| −19.474 | 12.756 | 259.138 |
| −21.000 | 14.699 | 259.138 |
| −22.439 | 16.593 | 259.138 |
| −23.795 | 18.436 | 259.138 |
| −25.071 | 20.223 | 259.138 |
| −26.271 | 21.952 | 259.138 |
| −27.341 | 23.538 | 259.138 |
| −28.288 | 24.976 | 259.138 |
| −29.114 | 26.264 | 259.138 |
| −29.877 | 27.479 | 259.138 |
| −30.527 | 28.539 | 259.138 |
| −31.014 | 29.363 | 259.138 |
| −31.391 | 30.029 | 259.138 |
| −31.655 | 30.538 | 259.138 |
| −31.834 | 30.930 | 259.138 |
| −31.912 | 31.156 | 259.138 |
| −31.934 | 31.307 | 259.138 |
| −31.923 | 31.382 | 259.138 |
| −31.905 | 31.415 | 259.138 |
| −31.464 | 32.050 | 265.104 |
| −31.447 | 32.060 | 265.104 |
| −31.411 | 32.068 | 265.104 |
| −31.336 | 32.056 | 265.104 |
| −31.203 | 31.990 | 265.104 |
| −31.017 | 31.850 | 265.104 |
| −30.707 | 31.569 | 265.104 |
| −30.309 | 31.177 | 265.104 |
| −29.797 | 30.638 | 265.104 |
| −29.165 | 29.955 | 265.104 |
| −28.349 | 29.063 | 265.104 |
| −27.406 | 28.034 | 265.104 |
| −26.397 | 26.941 | 265.104 |
| −25.258 | 25.714 | 265.104 |
| −23.988 | 24.354 | 265.104 |
| −22.584 | 22.865 | 265.104 |
| −21.110 | 21.316 | 265.104 |
| −19.563 | 19.706 | 265.104 |
| −17.944 | 18.038 | 265.104 |
| −16.249 | 16.313 | 265.104 |
| −14.478 | 14.533 | 265.104 |
| −12.627 | 12.701 | 265.104 |
| −10.694 | 10.821 | 265.104 |
| −8.678 | 8.894 | 265.104 |

TABLE I-continued

| X | Y | Z |
|---|---|---|
| −6.644 | 6.988 | 265.104 |
| −4.592 | 5.102 | 265.104 |
| −2.521 | 3.237 | 265.104 |
| −0.431 | 1.395 | 265.104 |
| 1.681 | −0.423 | 265.104 |
| 3.817 | −2.213 | 265.104 |
| 5.978 | −3.975 | 265.104 |
| 8.166 | −5.707 | 265.104 |
| 10.378 | −7.409 | 265.104 |
| 12.614 | −9.081 | 265.104 |
| 14.872 | −10.722 | 265.104 |
| 17.074 | −12.279 | 265.104 |
| 19.220 | −13.757 | 265.104 |
| 21.305 | −15.159 | 265.104 |
| 23.326 | −16.489 | 265.104 |
| 25.282 | −17.749 | 265.104 |
| 27.169 | −18.944 | 265.104 |
| 28.986 | −20.076 | 265.104 |
| 30.652 | −21.098 | 265.104 |
| 32.165 | −22.014 | 265.104 |
| 33.521 | −22.829 | 265.104 |
| 34.721 | −23.543 | 265.104 |
| 35.763 | −24.157 | 265.104 |
| 36.647 | −24.674 | 265.104 |
| 37.403 | −25.115 | 265.104 |
| 38.037 | −25.486 | 265.104 |
| 38.559 | −25.793 | 265.104 |
| 38.975 | −26.039 | 265.104 |
| 39.295 | −26.230 | 265.104 |
| 39.535 | −26.373 | 265.104 |
| 39.695 | −26.537 | 265.104 |
| 39.731 | −26.720 | 265.104 |
| 39.699 | −26.856 | 265.104 |
| 39.619 | −26.974 | 265.104 |
| 39.458 | −27.072 | 265.104 |
| 39.224 | −27.066 | 265.104 |
| 38.947 | −26.987 | 265.104 |
| 38.578 | −26.881 | 265.104 |
| 38.099 | −26.739 | 265.104 |
| 37.502 | −26.557 | 265.104 |
| 36.778 | −26.330 | 265.104 |
| 35.919 | −26.053 | 265.104 |
| 34.916 | −25.720 | 265.104 |
| 33.735 | −25.319 | 265.104 |
| 32.376 | −24.843 | 265.104 |
| 30.842 | −24.285 | 265.104 |
| 29.137 | −23.636 | 265.104 |
| 27.268 | −22.889 | 265.104 |
| 25.242 | −22.033 | 265.104 |
| 23.150 | −21.100 | 265.104 |
| 20.996 | −20.084 | 265.104 |
| 18.782 | −18.978 | 265.104 |
| 16.513 | −17.778 | 265.104 |
| 14.192 | −16.477 | 265.104 |
| 11.823 | −15.067 | 265.104 |
| 9.409 | −13.541 | 265.104 |
| 7.033 | −11.947 | 265.104 |
| 4.696 | −10.285 | 265.104 |
| 2.398 | −8.554 | 265.104 |
| 0.10278 | −6.763 | 265.104 |
| −2.046 | −4.919 | 265.104 |
| −4.185 | −3.026 | 265.104 |
| −6.272 | −1.086 | 265.104 |
| −8.311 | 0.62361 | 265.104 |
| −10.304 | 2.926 | 265.104 |
| −12.250 | 4.995 | 265.104 |
| −14.151 | 7.106 | 265.104 |
| −15.945 | 9.186 | 265.104 |
| −17.638 | 11.231 | 265.104 |
| −19.234 | 13.236 | 265.104 |
| −20.740 | 15.195 | 265.104 |
| −22.159 | 17.106 | 265.104 |
| −23.495 | 18.963 | 265.104 |
| −24.752 | 20.765 | 265.104 |
| −25.934 | 22.507 | 265.104 |
| −26.989 | 24.105 | 265.104 |
| −27.922 | 25.554 | 265.104 |

TABLE I-continued

| X | Y | Z |
|---|---|---|
| −28.736 | 26.852 | 265.104 |
| −29.488 | 28.076 | 265.104 |
| −30.127 | 29.144 | 265.104 |
| −30.606 | 29.973 | 265.104 |
| −30.976 | 30.644 | 265.104 |
| −31.234 | 31.157 | 265.104 |
| −31.409 | 31.551 | 265.104 |
| −31.486 | 31.777 | 265.104 |
| −31.507 | 31.928 | 265.104 |
| −31.496 | 32.004 | 265.104 |
| −31.477 | 32.037 | 265.104 |
| −31.019 | 32.811 | 271.071 |
| −31.002 | 32.820 | 271.071 |
| −30.965 | 32.827 | 271.071 |
| −30.891 | 32.813 | 271.071 |
| −30.759 | 32.743 | 271.071 |
| −30.575 | 32.597 | 271.071 |
| −30.268 | 32.308 | 271.071 |
| −29.875 | 31.906 | 271.071 |
| −29.371 | 31.352 | 271.071 |
| −28.750 | 30.650 | 271.071 |
| −27.947 | 29.735 | 271.071 |
| −27.020 | 28.679 | 271.071 |
| −26.027 | 27.557 | 271.071 |
| −24.905 | 26.298 | 271.071 |
| −23.654 | 24.904 | 271.071 |
| −22.270 | 23.337 | 271.071 |
| −20.816 | 21.788 | 271.071 |
| −19.290 | 20.137 | 271.071 |
| −17.692 | 18.427 | 271.071 |
| −16.019 | 16.657 | 271.071 |
| −14.269 | 14.831 | 271.071 |
| −12.440 | 12.952 | 271.071 |
| −10.530 | 11.022 | 271.071 |
| −8.536 | 9.045 | 271.071 |
| −6.523 | 7.088 | 271.071 |
| −4.492 | 5.150 | 271.071 |
| −2.443 | 3.232 | 271.071 |
| −0.376 | 1.334 | 271.071 |
| 1.711 | −0.544 | 271.071 |
| 3.818 | −2.400 | 271.071 |
| 5.946 | −4.233 | 271.071 |
| 8.098 | −6.040 | 271.071 |
| 10.274 | −7.819 | 271.071 |
| 12.472 | −9.568 | 271.071 |
| 14.692 | −11.291 | 271.071 |
| 16.856 | −12.932 | 271.071 |
| 18.962 | −14.496 | 271.071 |
| 21.005 | −15.987 | 271.071 |
| 22.984 | −17.407 | 271.071 |
| 24.896 | −18.760 | 271.071 |
| 26.740 | −20.046 | 271.071 |
| 28.514 | −21.268 | 271.071 |
| 30.140 | −22.377 | 271.071 |
| 31.614 | −23.374 | 271.071 |
| 32.936 | −24.263 | 271.071 |
| 34.104 | −25.044 | 271.071 |
| 35.118 | −25.718 | 271.071 |
| 35.978 | −26.287 | 271.071 |
| 36.712 | −26.773 | 271.071 |
| 37.328 | −27.183 | 271.071 |
| 37.835 | −27.521 | 271.071 |
| 38.239 | −27.793 | 271.071 |
| 38.549 | −28.003 | 271.071 |
| 38.782 | −28.161 | 271.071 |
| 38.934 | −28.334 | 271.071 |
| 38.962 | −28.518 | 271.071 |
| 38.922 | −28.652 | 271.071 |
| 38.834 | −28.765 | 271.071 |
| 38.666 | −28.851 | 271.071 |
| 38.432 | −28.824 | 271.071 |
| 38.160 | −28.726 | 271.071 |
| 37.798 | −28.594 | 271.071 |
| 37.329 | −28.419 | 271.071 |
| 36.743 | −28.196 | 271.071 |
| 36.034 | −27.921 | 271.071 |
| 35.192 | −27.588 | 271.071 |

TABLE I-continued

| X | Y | Z |
|---|---|---|
| 34.210 | −27.191 | 271.071 |
| 33.052 | −26.717 | 271.071 |
| 31.719 | −26.159 | 271.071 |
| 30.215 | −25.511 | 271.071 |
| 28.544 | −24.767 | 271.071 |
| 26.712 | −23.917 | 271.071 |
| 24.724 | −22.956 | 271.071 |
| 22.671 | −21.918 | 271.071 |
| 20.555 | −20.798 | 271.071 |
| 18.381 | −19.591 | 271.071 |
| 16.150 | −18.293 | 271.071 |
| 13.867 | −16.896 | 271.071 |
| 11.535 | −15.394 | 271.071 |
| 9.160 | −13.780 | 271.071 |
| 6.823 | −12.103 | 271.071 |
| 4.525 | −10.360 | 271.071 |
| 2.269 | −8.553 | 271.071 |
| 0.065 | −6.696 | 271.071 |
| −2.087 | −4.794 | 271.071 |
| −4.189 | −2.847 | 271.071 |
| −6.244 | −0.857 | 271.071 |
| −8.253 | 1.174 | 271.071 |
| −10.215 | 3.245 | 271.071 |
| −12.133 | 5.356 | 271.071 |
| −14.004 | 7.508 | 271.071 |
| −15.771 | 9.627 | 271.071 |
| −17.436 | 11.708 | 271.071 |
| −19.007 | 13.746 | 271.071 |
| −20.488 | 15.737 | 271.071 |
| −21.883 | 17.676 | 271.071 |
| −23.197 | 19.561 | 271.071 |
| −24.434 | 21.387 | 271.071 |
| −25.596 | 23.152 | 271.071 |
| −26.633 | 24.772 | 271.071 |
| −27.549 | 26.240 | 271.071 |
| −28.349 | 27.554 | 271.071 |
| −29.087 | 28.793 | 271.071 |
| −29.715 | 29.874 | 271.071 |
| −30.186 | 30.712 | 271.071 |
| −30.548 | 31.391 | 271.071 |
| −30.799 | 31.910 | 271.071 |
| −30.968 | 32.308 | 271.071 |
| −31.043 | 32.537 | 271.071 |
| −31.064 | 32.689 | 271.071 |
| −31.052 | 32.764 | 271.071 |
| −31.033 | 32.798 | 271.071 |
| −30.546 | 33.685 | 277.037 |
| −30.529 | 33.694 | 277.037 |
| −30.491 | 33.700 | 277.037 |
| −30.417 | 33.682 | 277.037 |
| −30.286 | 33.607 | 277.037 |
| −30.105 | 33.456 | 277.037 |
| −29.802 | 33.159 | 277.037 |
| −29.414 | 32.746 | 277.037 |
| −28.918 | 32.177 | 277.037 |
| −28.309 | 31.457 | 277.037 |
| −27.520 | 30.518 | 277.037 |
| −26.609 | 29.436 | 277.037 |
| −25.632 | 28.285 | 277.037 |
| −24.529 | 26.994 | 277.037 |
| −23.297 | 25.565 | 277.037 |
| −21.935 | 23.999 | 277.037 |
| −20.503 | 22.370 | 277.037 |
| −19.000 | 20.677 | 277.037 |
| −17.425 | 18.922 | 277.037 |
| −15.778 | 17.105 | 277.037 |
| −14.055 | 15.229 | 277.037 |
| −12.254 | 13.297 | 277.037 |
| −10.372 | 11.313 | 277.037 |
| −8.407 | 9.280 | 277.037 |
| −6.422 | 7.266 | 277.037 |
| −4.419 | 5.271 | 277.037 |
| −2.398 | 3.294 | 277.037 |
| −0.358 | 1.336 | 277.037 |
| 1.700 | −0.602 | 277.037 |
| 3.778 | −2.522 | 277.037 |
| 5.876 | −4.421 | 277.037 |

TABLE I-continued

| X | Y | Z |
|---|---|---|
| 7.995 | −6.297 | 277.037 |
| 10.134 | −8.149 | 277.037 |
| 12.293 | −9.977 | 277.037 |
| 14.472 | −11.782 | 277.037 |
| 16.595 | −13.508 | 277.037 |
| 18.657 | −15.157 | 277.037 |
| 20.657 | −16.734 | 277.037 |
| 22.592 | −18.241 | 277.037 |
| 24.460 | −19.681 | 277.037 |
| 26.259 | −21.055 | 277.037 |
| 27.988 | −22.365 | 277.037 |
| 29.571 | −23.557 | 277.037 |
| 31.004 | −24.633 | 277.037 |
| 32.287 | −25.594 | 277.037 |
| 33.421 | −26.442 | 277.037 |
| 34.404 | −27.175 | 277.037 |
| 35.236 | −27.795 | 277.037 |
| 35.947 | −28.325 | 277.037 |
| 36.543 | −28.771 | 277.037 |
| 37.033 | −29.141 | 277.037 |
| 37.424 | −29.437 | 277.037 |
| 37.723 | −29.666 | 277.037 |
| 37.948 | −29.839 | 277.037 |
| 38.096 | −30.018 | 277.037 |
| 38.116 | −30.205 | 277.037 |
| 38.068 | −30.338 | 277.037 |
| 37.974 | −30.445 | 277.037 |
| 37.799 | −30.518 | 277.037 |
| 37.566 | −30.471 | 277.037 |
| 37.300 | −30.355 | 277.037 |
| 36.947 | −30.198 | 277.037 |
| 36.488 | −29.993 | 277.037 |
| 35.915 | −29.733 | 277.037 |
| 35.221 | −29.413 | 277.037 |
| 34.398 | −29.027 | 277.037 |
| 33.437 | −28.571 | 277.037 |
| 32.303 | −28.027 | 277.037 |
| 30.999 | −27.392 | 277.037 |
| 29.527 | −26.659 | 277.037 |
| 27.890 | −25.824 | 277.037 |
| 26.095 | −24.880 | 277.037 |
| 24.145 | −23.820 | 277.037 |
| 22.130 | −22.683 | 277.037 |
| 20.053 | −21.466 | 277.037 |
| 17.917 | −20.163 | 277.037 |
| 15.726 | −18.770 | 277.037 |
| 13.482 | −17.280 | 277.037 |
| 11.191 | −15.686 | 277.037 |
| 8.857 | −13.983 | 277.037 |
| 6.650 | −12.221 | 277.037 |
| 4.302 | −10.400 | 277.037 |
| 2.089 | −8.524 | 277.037 |
| −0.073 | −6.604 | 277.037 |
| −2.185 | −4.641 | 277.037 |
| −4.249 | −2.636 | 277.037 |
| −6.265 | −0.591 | 277.037 |
| −8.236 | 1.493 | 277.037 |
| −10.161 | 3.617 | 277.037 |
| −12.041 | 5.779 | 277.037 |
| −13.876 | 7.980 | 277.037 |
| −15.606 | 10.145 | 277.037 |
| −17.237 | 12.269 | 277.037 |
| −18.776 | 14.347 | 277.037 |
| −20.226 | 16.375 | 277.037 |
| −21.593 | 18.347 | 277.037 |
| −22.882 | 20.262 | 277.037 |
| −24.094 | 22.117 | 277.037 |
| −25.234 | 23.907 | 277.037 |
| −26.251 | 25.549 | 277.037 |
| −27.150 | 27.037 | 277.037 |
| −27.934 | 28.368 | 277.037 |
| −28.658 | 29.623 | 277.037 |
| −29.274 | 30.717 | 277.037 |
| −29.736 | 31.565 | 277.037 |
| −30.090 | 32.252 | 277.037 |
| −30.334 | 32.777 | 277.037 |
| −30.498 | 33.179 | 277.037 |

TABLE I-continued

| X | Y | Z |
|---|---|---|
| −30.571 | 33.410 | 277.037 |
| −30.591 | 33.562 | 277.037 |
| −30.579 | 33.638 | 277.037 |
| −30.560 | 33.672 | 277.037 |
| −30.017 | 34.618 | 283.003 |
| −29.999 | 34.626 | 283.003 |
| −29.961 | 34.630 | 283.003 |
| −29.887 | 34.609 | 283.003 |
| −29.758 | 34.528 | 283.003 |
| −29.581 | 34.369 | 283.003 |
| −29.284 | 34.061 | 283.003 |
| −28.904 | 33.634 | 283.003 |
| −28.416 | 33.050 | 283.003 |
| −27.819 | 32.310 | 283.003 |
| −27.044 | 31.346 | 283.003 |
| −26.148 | 30.235 | 283.003 |
| −25.187 | 29.054 | 283.003 |
| −24.102 | 27.730 | 283.003 |
| −22.890 | 26.263 | 283.003 |
| −21.549 | 24.656 | 283.003 |
| −20.139 | 22.983 | 283.003 |
| −18.658 | 21.245 | 283.003 |
| −17.106 | 19.443 | 283.003 |
| −15.482 | 17.577 | 283.003 |
| −13.784 | 15.650 | 283.003 |
| −12.009 | 13.665 | 283.003 |
| −10.155 | 11.624 | 283.003 |
| −8.219 | 9.529 | 283.003 |
| −6.264 | 7.452 | 283.003 |
| −4.291 | 5.393 | 283.003 |
| −2.300 | 3.350 | 283.003 |
| −0.291 | 1.325 | 283.003 |
| 1.737 | −0.682 | 283.003 |
| 3.784 | −−2.671 | 283.003 |
| 5.849 | −4.640 | 283.003 |
| 7.933 | −6.588 | 283.003 |
| 10.035 | −8.516 | 283.003 |
| 12.156 | −10.423 | 283.003 |
| 14.294 | −12.311 | 283.003 |
| 16.376 | −14.120 | 283.003 |
| 18.398 | −15.853 | 283.003 |
| 20.358 | −17.513 | 283.003 |
| 22.252 | −19.103 | 283.003 |
| 24.079 | −20.625 | 283.003 |
| 25.836 | −22.083 | 283.003 |
| 27.523 | −23.476 | 283.003 |
| 29.065 | −24.746 | 283.003 |
| 30.460 | −25.895 | 283.003 |
| 31.709 | −26.922 | 283.003 |
| 32.810 | −27.829 | 283.003 |
| 33.765 | −28.615 | 283.003 |
| 34.573 | −29.280 | 283.003 |
| 35.263 | −29.849 | 283.003 |
| 35.842 | −30.329 | 283.003 |
| 36.316 | −30.725 | 283.003 |
| 36.695 | −31.043 | 283.003 |
| 36.986 | −31.288 | 283.003 |
| 37.203 | −31.473 | 283.003 |
| 37.351 | −31.657 | 283.003 |
| 37.368 | −31.848 | 283.003 |
| 37.314 | −31.983 | 283.003 |
| 37.213 | −32.086 | 283.003 |
| 37.032 | −32.146 | 283.003 |
| 36.802 | −32.078 | 283.003 |
| 36.543 | −31.945 | 283.003 |
| 36.197 | −31.766 | 283.003 |
| 35.749 | −31.532 | 283.003 |
| 35.189 | −31.237 | 283.003 |
| 34.511 | −30.874 | 283.003 |
| 33.707 | −30.439 | 283.003 |
| 32.767 | −29.927 | 283.003 |
| 31.659 | −29.317 | 283.003 |
| 30.384 | −28.608 | 283.003 |
| 28.944 | −27.794 | 283.003 |
| 27.343 | −26.870 | 283.003 |
| 25.585 | −25.832 | 283.003 |
| 23.675 | −24.674 | 283.003 |

TABLE I-continued

| X | Y | Z |
|---|---|---|
| 21.699 | −23.440 | 283.003 |
| 19.661 | −22.127 | 283.003 |
| 17.564 | −20.729 | 283.003 |
| 15.411 | −19.242 | 283.003 |
| 13.206 | −17.659 | 283.003 |
| 10.955 | −15.973 | 283.003 |
| 8.662 | −14.178 | 283.003 |
| 6.407 | −12.330 | 283.003 |
| 4.190 | −10.428 | 283.003 |
| 2.021 | −8.481 | 283.003 |
| −0.099 | −6.493 | 283.003 |
| −2.169 | −4.465 | 283.003 |
| −4.193 | −2.397 | 283.003 |
| −6.170 | −0.291 | 283.003 |
| −8.101 | 1.852 | 283.003 |
| −9.989 | 4.032 | 283.003 |
| −11.832 | 6.249 | 283.003 |
| −13.631 | 8.502 | 283.003 |
| −15.328 | 10.715 | 283.003 |
| −16.930 | 12.883 | 283.003 |
| −18.440 | 15.001 | 283.003 |
| −19.865 | 17.065 | 283.003 |
| −21.209 | 19.071 | 283.003 |
| −22.475 | 21.017 | 283.003 |
| −23.666 | 22.900 | 283.003 |
| −24.787 | 24.717 | 283.003 |
| −25.788 | 26.382 | 283.003 |
| −26.672 | 27.891 | 283.003 |
| −27.445 | 29.239 | 283.003 |
| −28.158 | 30.510 | 283.003 |
| −28.764 | 31.618 | 283.003 |
| −29.219 | 32.476 | 283.003 |
| −29.566 | 33.171 | 283.003 |
| −29.806 | 33.703 | 283.003 |
| −29.968 | 34.109 | 283.003 |
| −30.040 | 34.341 | 283.003 |
| −30.061 | 34.494 | 283.003 |
| −30.050 | 34.571 | 283.003 |
| −30.031 | 34.605 | 283.003 |
| −28.759 | 36.487 | 294.936 |
| −28.741 | 36.495 | 294.936 |
| −28.702 | 36.495 | 294.936 |
| −28.629 | 36.467 | 294.936 |
| −28.506 | 36.373 | 294.936 |
| −28.339 | 36.197 | 294.936 |
| −28.055 | 35.865 | 294.936 |
| −27.693 | 35.410 | 294.936 |
| −27.228 | 34.789 | 294.936 |
| −26.658 | 34.005 | 294.936 |
| −25.916 | 32.986 | 294.936 |
| −25.056 | 31.813 | 294.936 |
| −24.133 | 30.566 | 294.936 |
| −23.087 | 29.169 | 294.936 |
| −21.918 | 27.622 | 294.936 |
| −20.622 | 25.928 | 294.936 |
| −19.258 | 24.164 | 294.936 |
| −17.822 | 22.333 | 294.936 |
| −16.316 | 20.434 | 294.936 |
| −14.738 | 18.469 | 294.936 |
| −13.086 | 16.438 | 294.936 |
| −11.361 | 14.342 | 294.936 |
| −9.561 | 12.183 | 294.936 |
| −7.685 | 9.962 | 294.936 |
| −5.794 | 7.753 | 294.936 |
| −3.889 | 5.556 | 294.936 |
| −1.969 | 3.371 | 294.936 |
| −0.033 | 1.200 | 294.936 |
| 1.918 | −0.956 | 294.936 |
| 3.887 | −3.096 | 294.936 |
| 5.872 | −5.219 | 294.936 |
| 7.875 | −7.327 | 294.936 |
| 9.895 | −9.419 | 294.936 |
| 11.932 | −11.495 | 294.936 |
| 13.983 | −13.557 | 294.936 |
| 15.978 | −15.538 | 294.936 |
| 17.914 | −17.441 | 294.936 |
| 19.788 | −19.269 | 294.936 |

TABLE I-continued

| X | Y | Z |
|---|---|---|
| 21.598 | −21.023 | 294.936 |
| 23.342 | −22.707 | 294.936 |
| 25.018 | −24.320 | 294.936 |
| 26.627 | −25.864 | 294.936 |
| 28.097 | −27.273 | 294.936 |
| 29.427 | −28.547 | 294.936 |
| 30.617 | −29.688 | 294.936 |
| 31.666 | −30.695 | 294.936 |
| 32.575 | −31.568 | 294.936 |
| 33.344 | −32.307 | 294.936 |
| 34.001 | −32.939 | 294.936 |
| 34.551 | −33.472 | 294.936 |
| 35.003 | −33.911 | 294.936 |
| 35.363 | −34.263 | 294.936 |
| 35.640 | −34.535 | 294.936 |
| 35.848 | −34.739 | 294.936 |
| 35.992 | −34.931 | 294.936 |
| 36.001 | −35.126 | 294.936 |
| 35.936 | −35.259 | 294.936 |
| 35.823 | −35.351 | 294.936 |
| 35.633 | −35.386 | 294.936 |
| 35.415 | −35.282 | 294.936 |
| 35.170 | −35.117 | 294.936 |
| 34.844 | −34.897 | 294.936 |
| 34.422 | −34.611 | 294.936 |
| 33.894 | −34.251 | 294.936 |
| 33.255 | −33.811 | 294.936 |
| 32.495 | −33.286 | 294.936 |
| 31.608 | −32.669 | 294.936 |
| 30.562 | −31.937 | 294.936 |
| 29.357 | −31.089 | 294.936 |
| 27.996 | −30.121 | 294.936 |
| 26.482 | −29.030 | 294.936 |
| 24.819 | −27.812 | 294.936 |
| 23.011 | −26.462 | 294.936 |
| 21.139 | −25.035 | 294.936 |
| 19.206 | −23.528 | 294.936 |
| 17.214 | −21.937 | 294.936 |
| 15.167 | −20.258 | 294.936 |
| 13.070 | −18.487 | 294.936 |
| 10.927 | −16.616 | 294.936 |
| 8.742 | −14.642 | 294.936 |
| 6.592 | −12.625 | 294.936 |
| 4.480 | −10.569 | 294.936 |
| 2.410 | −8.475 | 294.936 |
| 0.26389 | −6.343 | 294.936 |
| −1.609 | −4.173 | 294.936 |
| −3.558 | −1.966 | 294.936 |
| −5.468 | 0.19167 | 294.936 |
| −7.340 | 2.554 | 294.936 |
| −9.173 | 4.863 | 294.936 |
| −10.967 | 7.201 | 294.936 |
| −12.723 | 9.568 | 294.936 |
| −14.384 | 11.884 | 294.936 |
| −15.954 | 14.144 | 294.936 |
| −17.436 | 16.345 | 294.936 |
| −18.834 | 18.484 | 294.936 |
| −20.151 | 20.558 | 294.936 |
| −21.390 | 22.566 | 294.936 |
| −22.555 | 24.503 | 294.936 |
| −23.649 | 26.368 | 294.936 |
| −24.626 | 28.074 | 294.936 |
| −25.491 | 29.618 | 294.936 |
| −26.246 | 30.998 | 294.936 |
| −26.941 | 32.298 | 294.936 |
| −27.531 | 33.432 | 294.936 |
| −27.976 | 34.308 | 294.936 |
| −28.314 | 35.018 | 294.936 |
| −28.547 | 35.560 | 294.936 |
| −28.705 | 35.973 | 294.936 |
| −28.780 | 36.207 | 294.936 |
| −28.803 | 36.362 | 294.936 |
| −28.793 | 36.440 | 294.936 |
| −28.774 | 36.474 | 294.936 |
| −27.378 | 38.739 | 306.868 |
| −27.359 | 38.746 | 306.868 |
| −27.319 | 38.743 | 306.868 |

TABLE I-continued

| X | Y | Z |
|---|---|---|
| −27.248 | 38.709 | 306.868 |
| −27.130 | 38.604 | 306.868 |
| −26.975 | 38.413 | 306.868 |
| −26.712 | 38.055 | 306.868 |
| −26.376 | 37.570 | 306.868 |
| −25.944 | 36.911 | 306.868 |
| −25.411 | 36.083 | 306.868 |
| −24.714 | 35.010 | 306.868 |
| −23.900 | 33.778 | 306.868 |
| −23.021 | 32.471 | 306.868 |
| −22.023 | 31.007 | 306.868 |
| −20.901 | 29.389 | 306.868 |
| −19.656 | 27.617 | 306.868 |
| −18.342 | 25.773 | 306.868 |
| −16.961 | 23.856 | 306.868 |
| −15.512 | 21.867 | 306.868 |
| −13.997 | 19.804 | 306.868 |
| −12.414 | 17.669 | 306.868 |
| −10.762 | 15.462 | 306.868 |
| −9.042 | 13.185 | 306.868 |
| −7.252 | 10.837 | 306.868 |
| −5.455 | 8.495 | 306.868 |
| −3.650 | 6.158 | 306.868 |
| −1.839 | 3.827 | 306.868 |
| −0.018 | 1.503 | 306.868 |
| 1.814 | −0.812 | 306.868 |
| 3.660 | −3.117 | 306.868 |
| 5.521 | −5.409 | 306.868 |
| 7.400 | −7.687 | 306.868 |
| 9.296 | −9.952 | 306.868 |
| 11.210 | −12.202 | 306.868 |
| 13.140 | −14.437 | 306.868 |
| 15.022 | −16.584 | 306.868 |
| 16.852 | −18.645 | 306.868 |
| 18.629 | −20.622 | 306.868 |
| 20.350 | −22.518 | 306.868 |
| 22.011 | −24.333 | 306.868 |
| 23.611 | −26.073 | 306.868 |
| 25.147 | −27.737 | 306.868 |
| 26.549 | −29.256 | 306.868 |
| 27.818 | −30.632 | 306.868 |
| 28.952 | −31.862 | 306.868 |
| 29.952 | −32.949 | 306.868 |
| 30.819 | −33.891 | 306.868 |
| 31.552 | −34.689 | 306.868 |
| 32.177 | −35.371 | 306.868 |
| 32.703 | −35.944 | 306.868 |
| 33.134 | −36.417 | 306.868 |
| 33.479 | −36.796 | 306.868 |
| 33.744 | −37.087 | 306.868 |
| 33.942 | −37.306 | 306.868 |
| 34.081 | −37.504 | 306.868 |
| 34.079 | −37.696 | 306.868 |
| 34.006 | −37.822 | 306.868 |
| 33.883 | −37.904 | 306.868 |
| 33.687 | −37.911 | 306.868 |
| 33.483 | −37.773 | 306.868 |
| 33.255 | −37.581 | 306.868 |
| 32.952 | −37.325 | 306.868 |
| 32.558 | −36.991 | 306.868 |
| 32.065 | −36.573 | 306.868 |
| 31.468 | −36.064 | 306.868 |
| 30.759 | −35.456 | 306.868 |
| 29.930 | −34.744 | 306.868 |
| 28.953 | −33.900 | 306.868 |
| 27.827 | −32.924 | 306.868 |
| 26.554 | −31.815 | 306.868 |
| 25.136 | −30.570 | 306.868 |
| 23.575 | −29.186 | 306.868 |
| 21.875 | −27.661 | 306.868 |
| 20.114 | −26.057 | 306.868 |
| 18.295 | −24.369 | 306.868 |
| 16.424 | −22.593 | 306.868 |
| 14.504 | −20.724 | 306.868 |
| 12.539 | −18.758 | 306.868 |
| 10.533 | −16.692 | 306.868 |
| 8.490 | −14.520 | 306.868 |

TABLE I-continued

| X | Y | Z |
|---|---|---|
| 6.483 | −12.316 | 306.868 |
| 4.513 | −10.082 | 306.868 |
| 2.582 | −7.818 | 306.868 |
| 0.47639 | −5.525 | 306.868 |
| −1.174 | −3.205 | 306.868 |
| −3.001 | −0.859 | 306.868 |
| −4.797 | 1.512 | 306.868 |
| −6.564 | 3.905 | 306.868 |
| −8.305 | 6.319 | 306.868 |
| −10.020 | 8.753 | 306.868 |
| −11.708 | 11.209 | 306.868 |
| −13.311 | 13.602 | 306.868 |
| −14.832 | 15.930 | 306.868 |
| −16.274 | 18.192 | 306.868 |
| −17.639 | 20.385 | 306.868 |
| −18.929 | 22.506 | 306.868 |
| −20.148 | 24.556 | 306.868 |
| −21.296 | 26.531 | 306.868 |
| −22.376 | 28.431 | 306.868 |
| −23.341 | 30.168 | 306.868 |
| −24.192 | 31.740 | 306.868 |
| −24.934 | 33.146 | 306.868 |
| −25.613 | 34.473 | 306.868 |
| −26.187 | 35.630 | 306.868 |
| −26.619 | 36.524 | 306.868 |
| −26.947 | 37.248 | 306.868 |
| −27.174 | 37.799 | 306.868 |
| −27.328 | 38.219 | 306.868 |
| −27.402 | 38.456 | 306.868 |
| −27.423 | 38.613 | 306.868 |
| −27.412 | 38.692 | 306.868 |
| −27.393 | 38.726 | 306.868 |
| −26.617 | 40.211 | 312.835 |
| −26.598 | 40.218 | 312.835 |
| −26.558 | 40.214 | 312.835 |
| −26.488 | 40.177 | 312.835 |
| −26.373 | 40.067 | 312.835 |
| −26.223 | 39.870 | 312.835 |
| −25.972 | 39.501 | 312.835 |
| −25.650 | 39.001 | 312.835 |
| −25.236 | 38.325 | 312.835 |
| −24.725 | 37.476 | 312.835 |
| −24.054 | 36.376 | 312.835 |
| −23.270 | 35.113 | 312.835 |
| −22.421 | 33.774 | 312.835 |
| −21.452 | 32.275 | 312.835 |
| −20.362 | 30.620 | 312.835 |
| −19.148 | 28.809 | 312.835 |
| −17.864 | 26.926 | 312.835 |
| −16.512 | 24.969 | 312.835 |
| −15.095 | 22.938 | 312.835 |
| −13.612 | 20.831 | 312.835 |
| −12.066 | 18.647 | 312.835 |
| −10.456 | 16.388 | 312.835 |
| −8.782 | 14.051 | 312.835 |
| −7.047 | 11.637 | 312.835 |
| −5.307 | 9.227 | 312.835 |
| −3.564 | 6.818 | 312.835 |
| −1.817 | 4.413 | 312.835 |
| −0.063 | 2.013 | 312.835 |
| 1.701 | −0.380 | 312.835 |
| 3.477 | −2.764 | 312.835 |
| 5.268 | −5.136 | 312.835 |
| 7.077 | −7.494 | 312.835 |
| 8.907 | −9.837 | 312.835 |
| 10.758 | −12.164 | 312.835 |
| 12.629 | −14.474 | 312.835 |
| 14.455 | −16.693 | 312.835 |
| 16.231 | −18.824 | 312.835 |
| 17.957 | −20.869 | 312.835 |
| 19.628 | −22.830 | 312.835 |
| 21.242 | −24.709 | 312.835 |
| 22.797 | −26.509 | 312.835 |
| 24.291 | −28.230 | 312.835 |
| 25.658 | −29.799 | 312.835 |
| 26.896 | −31.218 | 312.835 |
| 28.004 | −32.487 | 312.835 |

TABLE I-continued

| X | Y | Z |
|---|---|---|
| 28.982 | −33.606 | 312.835 |
| 29.829 | −34.577 | 312.835 |
| 30.546 | −35.398 | 312.835 |
| 31.157 | −36.101 | 312.835 |
| 31.671 | −36.692 | 312.835 |
| 32.093 | −37.178 | 312.835 |
| 32.430 | −37.568 | 312.835 |
| 32.689 | −37.868 | 312.835 |
| 32.883 | −38.093 | 312.835 |
| 33.024 | −38.294 | 312.835 |
| 33.021 | −38.488 | 312.835 |
| 32.943 | −38.612 | 312.835 |
| 32.816 | −38.688 | 312.835 |
| 32.619 | −38.682 | 312.835 |
| 32.423 | −38.531 | 312.835 |
| 32.203 | −38.327 | 312.835 |
| 31.910 | −38.056 | 312.835 |
| 31.529 | −37.703 | 312.835 |
| 31.053 | −37.261 | 312.835 |
| 30.476 | −36.724 | 312.835 |
| 29.790 | −36.083 | 312.835 |
| 28.988 | −35.332 | 312.835 |
| 28.042 | −34.442 | 312.835 |
| 26.953 | −33.414 | 312.835 |
| 25.722 | −32.244 | 312.835 |
| 24.352 | −30.932 | 312.835 |
| 22.845 | −29.475 | 312.835 |
| 21.206 | −27.868 | 312.835 |
| 19.508 | −26.179 | 312.835 |
| 17.754 | −24.404 | 312.835 |
| 15.949 | −22.541 | 312.835 |
| 14.096 | −20.585 | 312.835 |
| 12.200 | −18.533 | 312.835 |
| 10.263 | −16.380 | 312.835 |
| 8.293 | −14.121 | 312.835 |
| 6.360 | −11.833 | 312.835 |
| 4.465 | −9.516 | 312.835 |
| 2.609 | −7.170 | 312.835 |
| 0.54722 | −4.799 | 312.835 |
| −1.000 | −2.403 | 312.835 |
| −2.759 | 0.015 | 312.835 |
| −4.491 | 2.452 | 312.835 |
| −6.199 | 4.907 | 312.835 |
| −7.886 | 7.378 | 312.835 |
| −9.552 | 9.865 | 312.835 |
| −11.198 | 12.366 | 312.835 |
| −12.767 | 14.799 | 312.835 |
| −14.261 | 17.160 | 312.835 |
| −15.681 | 19.450 | 312.835 |
| −17.030 | 21.667 | 312.835 |
| −18.307 | 23.811 | 312.835 |
| −19.514 | 25.880 | 312.835 |
| −20.650 | 27.875 | 312.835 |
| −21.717 | 29.794 | 312.835 |
| −22.667 | 31.550 | 312.835 |
| −23.505 | 33.140 | 312.835 |
| −24.232 | 34.561 | 312.835 |
| −24.897 | 35.903 | 312.835 |
| −25.459 | 37.073 | 312.835 |
| −25.880 | 37.978 | 312.835 |
| −26.200 | 38.709 | 312.835 |
| −26.422 | 39.266 | 312.835 |
| −26.574 | 39.688 | 312.835 |
| −26.644 | 39.928 | 312.835 |
| −26.664 | 40.086 | 312.835 |
| −26.653 | 40.164 | 312.835 |
| −26.633 | 40.199 | 312.835 |
| −25.909 | 41.869 | 318.801 |
| −25.890 | 41.875 | 318.801 |
| −25.850 | 41.870 | 318.801 |
| −25.779 | 41.831 | 318.801 |
| −25.665 | 41.718 | 318.801 |
| −25.520 | 41.516 | 318.801 |
| −25.278 | 41.137 | 318.801 |
| −24.968 | 40.624 | 318.801 |
| −24.568 | 39.932 | 318.801 |
| −24.073 | 39.065 | 318.801 |

TABLE I-continued

| X | Y | Z |
|---|---|---|
| −23.423 | 37.940 | 318.801 |
| −22.663 | 36.649 | 318.801 |
| −21.838 | 35.280 | 318.801 |
| −20.897 | 33.748 | 318.801 |
| −19.837 | 32.055 | 318.801 |
| −18.655 | 30.203 | 318.801 |
| −17.403 | 28.277 | 318.801 |
| −16.082 | 26.277 | 318.801 |
| −14.695 | 24.201 | 318.801 |
| −13.243 | 22.048 | 318.801 |
| −11.729 | 19.817 | 318.801 |
| −10.156 | 17.504 | 318.801 |
| −8.526 | 15.110 | 318.801 |
| −6.840 | 12.634 | 318.801 |
| −5.153 | 10.157 | 318.801 |
| −3.464 | 7.682 | 318.801 |
| −1.772 | 5.209 | 318.801 |
| −0.074 | 2.741 | 318.801 |
| 1.633 | 0.19306 | 318.801 |
| 3.351 | −2.176 | 318.801 |
| 5.085 | −4.620 | 318.801 |
| 6.836 | −7.050 | 318.801 |
| 8.608 | −9.466 | 318.801 |
| 10.401 | −11.867 | 318.801 |
| 12.215 | −14.252 | 318.801 |
| 13.986 | −16.543 | 318.801 |
| 15.713 | −18.742 | 318.801 |
| 17.393 | −20.852 | 318.801 |
| 19.021 | −22.874 | 318.801 |
| 20.596 | −24.812 | 318.801 |
| 22.115 | −26.666 | 318.801 |
| 23.575 | −28.439 | 318.801 |
| 24.911 | −30.056 | 318.801 |
| 26.121 | −31.518 | 318.801 |
| 27.205 | −32.825 | 318.801 |
| 28.160 | −33.979 | 318.801 |
| 28.987 | −34.980 | 318.801 |
| 29.687 | −35.828 | 318.801 |
| 30.283 | −36.552 | 318.801 |
| 30.784 | −37.162 | 318.801 |
| 31.196 | −37.664 | 318.801 |
| 31.525 | −38.066 | 318.801 |
| 31.778 | −38.375 | 318.801 |
| 31.967 | −38.607 | 318.801 |
| 32.108 | −38.811 | 318.801 |
| 32.104 | −39.007 | 318.801 |
| 32.022 | −39.130 | 318.801 |
| 31.890 | −39.201 | 318.801 |
| 31.693 | −39.183 | 318.801 |
| 31.504 | −39.019 | 318.801 |
| 31.292 | −38.805 | 318.801 |
| 31.008 | −38.521 | 318.801 |
| 30.639 | −38.151 | 318.801 |
| 30.179 | −37.687 | 318.801 |
| 29.619 | −37.124 | 318.801 |
| 28.955 | −36.453 | 318.801 |
| 28.178 | −35.667 | 318.801 |
| 27.261 | −34.736 | 318.801 |
| 26.205 | −33.661 | 318.801 |
| 25.012 | −32.439 | 318.801 |
| 23.683 | −31.069 | 318.801 |
| 22.220 | −29.549 | 318.801 |
| 20.629 | −27.874 | 318.801 |
| 18.983 | −26.115 | 318.801 |
| 17.284 | −24.267 | 318.801 |
| 15.537 | −22.327 | 318.801 |
| 13.745 | −20.293 | 318.801 |
| 11.912 | −18.160 | 318.801 |
| 10.043 | −15.924 | 318.801 |
| 8.142 | −13.583 | 318.801 |
| 6.278 | −11.215 | 318.801 |
| 4.450 | −8.820 | 318.801 |
| 2.657 | −6.400 | 318.801 |
| 0.62292 | −3.955 | 318.801 |
| −0.833 | −1.489 | 318.801 |
| −2.537 | 0.69236 | 318.801 |
| −4.217 | 3.500 | 318.801 |

TABLE I-continued

| X | Y | Z |
|---|---|---|
| −5.876 | 6.017 | 318.801 |
| −7.516 | 8.546 | 318.801 |
| −9.138 | 11.087 | 318.801 |
| −10.744 | 13.638 | 318.801 |
| −12.282 | 16.114 | 318.801 |
| −13.752 | 18.513 | 318.801 |
| −15.154 | 20.836 | 318.801 |
| −16.486 | 23.083 | 318.801 |
| −17.748 | 25.256 | 318.801 |
| −18.938 | 27.353 | 318.801 |
| −20.057 | 29.375 | 318.801 |
| −21.107 | 31.321 | 318.801 |
| −22.042 | 33.100 | 318.801 |
| −22.865 | 34.711 | 318.801 |
| −23.580 | 36.151 | 318.801 |
| −24.233 | 37.510 | 318.801 |
| −25.785 | 38.694 | 318.801 |
| −25.197 | 39.611 | 318.801 |
| −25.509 | 40.351 | 318.801 |
| −25.726 | 40.914 | 318.801 |
| −28.875 | 41.341 | 318.801 |
| −25.942 | 41.583 | 318.801 |
| −25.959 | 41.743 | 318.801 |
| −25.946 | 41.822 | 318.801 |
| −25.925 | 41.856 | 318.801 |
| −25.198 | 43.989 | 324.767 |
| −25.178 | 43.995 | 324.767 |
| −25.138 | 43.989 | 324.767 |
| −25.068 | 43.948 | 324.767 |
| −24.957 | 43.829 | 324.767 |
| −24.818 | 43.619 | 324.767 |
| −24.589 | 43.227 | 324.767 |
| −24.295 | 42.698 | 324.767 |
| −23.915 | 41.986 | 324.767 |
| −23.444 | 41.094 | 324.767 |
| −22.823 | 39.939 | 324.767 |
| −22.092 | 38.613 | 324.767 |
| −21.296 | 37.209 | 324.767 |
| −20.383 | 35.639 | 324.767 |
| −19.353 | 33.904 | 324.767 |
| −18.201 | 32.007 | 324.767 |
| −16.981 | 30.033 | 324.767 |
| −15.693 | 27.983 | 324.767 |
| −14.340 | 25.854 | 324.767 |
| −12.924 | 23.646 | 324.767 |
| −11.448 | 21.358 | 324.767 |
| −9.913 | 18.986 | 324.767 |
| −8.323 | 16.530 | 324.767 |
| −6.680 | 13.989 | 324.767 |
| −5.037 | 11.447 | 324.767 |
| −3.393 | 8.905 | 324.767 |
| −1.748 | 6.365 | 324.767 |
| −0.098 | 3.827 | 324.767 |
| 1.558 | 1.294 | 324.767 |
| 3.223 | −1.233 | 324.767 |
| 4.902 | −3.751 | 324.767 |
| 6.598 | −6.258 | 324.767 |
| 8.312 | −8.753 | 324.767 |
| 10.048 | −11.232 | 324.767 |
| 11.805 | −13.696 | 324.767 |
| 13.525 | −16.063 | 324.767 |
| 15.203 | −18.335 | 324.767 |
| 16.838 | −20.515 | 324.767 |
| 18.424 | −22.604 | 324.767 |
| 19.959 | −24.606 | 324.767 |
| 21.438 | −26.523 | 324.767 |
| 22.859 | −28.358 | 324.767 |
| 24.157 | −30.033 | 324.767 |
| 25.332 | −31.548 | 324.767 |
| 26.382 | −32.904 | 324.767 |
| 27.307 | −34.102 | 324.767 |
| 28.108 | −35.141 | 324.767 |
| 28.783 | −36.022 | 324.767 |
| 29.360 | −36.775 | 324.767 |
| 29.843 | −37.408 | 324.767 |
| 30.241 | −37.930 | 324.767 |
| 30.559 | −38.347 | 324.767 |

TABLE I-continued

| X | Y | Z |
|---|---|---|
| 30.803 | −38.669 | 324.767 |
| 30.986 | −38.910 | 324.767 |
| 31.125 | −39.119 | 324.767 |
| 31.118 | −39.318 | 324.767 |
| 31.030 | −39.440 | 324.767 |
| 30.894 | −39.505 | 324.767 |
| 30.697 | −39.474 | 324.767 |
| 30.516 | −39.298 | 324.767 |
| 30.310 | −39.074 | 324.767 |
| 30.036 | −38.775 | 324.767 |
| 29.680 | −38.385 | 324.767 |
| 29.236 | −37.899 | 324.767 |
| 28.695 | −37.307 | 324.767 |
| 28.053 | −36.603 | 324.767 |
| 27.301 | −35.778 | 324.767 |
| 26.415 | −34.803 | 324.767 |
| 25.393 | −33.675 | 324.767 |
| 24.237 | −30.396 | 324.767 |
| 22.949 | −30.963 | 324.767 |
| 21.530 | −29.375 | 324.767 |
| 19.985 | −27.629 | 324.767 |
| 18.385 | −25.796 | 324.767 |
| 16.735 | −23.873 | 324.767 |
| 15.037 | −21.857 | 324.767 |
| 13.298 | −19.743 | 324.767 |
| 11.522 | −17.528 | 324.767 |
| 9.713 | −15.208 | 324.767 |
| 7.876 | −12.780 | 324.767 |
| 6.076 | −10.328 | 324.767 |
| 4.312 | −7.850 | 324.767 |
| 2.580 | −5.351 | 324.767 |
| 0.60903 | −2.831 | 324.767 |
| −0.799 | −0.292 | 324.767 |
| −2.451 | 2.262 | 324.767 |
| −4.084 | 4.830 | 324.767 |
| −5.698 | 7.410 | 324.767 |
| −7.295 | 10.000 | 324.767 |
| −8.878 | 12.599 | 324.767 |
| −10.448 | 15.206 | 324.767 |
| −11.952 | 17.734 | 324.767 |
| −13.392 | 20.183 | 324.767 |
| −14.764 | 22.552 | 324.767 |
| −16.069 | 24.844 | 324.767 |
| −17.304 | 27.059 | 324.767 |
| −18.469 | 29.196 | 324.767 |
| −19.564 | 31.256 | 324.767 |
| −20.591 | 33.238 | 324.767 |
| −21.503 | 35.051 | 324.767 |
| −22.304 | 36.692 | 324.767 |
| −22.997 | 38.160 | 324.767 |
| −23.627 | 39.545 | 324.767 |
| −24.155 | 40.754 | 324.767 |
| −24.547 | 41.690 | 324.767 |
| −24.841 | 42.446 | 324.767 |
| −25.043 | 43.021 | 324.767 |
| −25.181 | 43.456 | 324.767 |
| −25.241 | 43.702 | 324.767 |
| −25.252 | 43.864 | 324.767 |
| −25.236 | 43.943 | 324.767 |
| −25.214 | 43.977 | 324.767 |
| −24.469 | 46.543 | 330.733 |
| −24.449 | 46.549 | 330.733 |
| −24.408 | 46.542 | 330.733 |
| −24.339 | 46.498 | 330.733 |
| −24.231 | 46.375 | 330.733 |
| −24.097 | 46.158 | 330.733 |
| −23.879 | 45.754 | 330.733 |
| −23.598 | 45.209 | 330.733 |
| −23.236 | 44.477 | 330.733 |
| −22.787 | 43.560 | 330.733 |
| −22.195 | 43.372 | 330.733 |
| −21.494 | 41.010 | 330.733 |
| −20.726 | 39.569 | 330.733 |
| −19.840 | 37.958 | 330.733 |
| −18.836 | 36.181 | 330.733 |
| −17.709 | 34.238 | 330.733 |
| −16.513 | 32.217 | 330.733 |

TABLE I-continued

| X | Y | Z |
|---|---|---|
| −15.252 | 30.116 | 330.733 |
| −13.931 | 27.933 | 330.733 |
| −12.551 | 25.665 | 330.733 |
| −11.114 | 23.313 | 330.733 |
| −9.621 | 20.875 | 330.733 |
| −8.073 | 18.351 | 330.733 |
| −6.473 | 15.740 | 330.733 |
| −4.877 | 13.126 | 330.733 |
| −3.286 | 10.509 | 330.733 |
| −1.699 | 7.889 | 330.733 |
| −0.113 | 5.269 | 330.733 |
| 1.474 | 2.649 | 330.733 |
| 3.067 | 0.034 | 330.733 |
| 4.672 | −2.575 | 330.733 |
| 6.293 | −5.174 | 330.733 |
| 7.935 | −7.758 | 330.733 |
| 9.600 | −10.328 | 330.733 |
| 11.289 | −12.883 | 330.733 |
| 12.943 | −15.339 | 330.733 |
| 14.556 | −17.698 | 330.733 |
| 16.127 | −19.963 | 330.733 |
| 17.651 | −22.136 | 330.733 |
| 19.125 | −24.219 | 330.733 |
| 20.547 | −26.215 | 330.733 |
| 21.913 | −28.125 | 330.733 |
| 23.161 | −29.868 | 330.733 |
| 24.291 | −31.445 | 330.733 |
| 25.301 | −32.856 | 330.733 |
| 26.190 | −34.102 | 330.733 |
| 26.960 | −35.184 | 330.733 |
| 27.609 | −36.100 | 330.733 |
| 28.162 | −36.884 | 330.733 |
| 28.627 | −37.543 | 330.733 |
| 29.009 | −38.086 | 330.733 |
| 29.314 | −38.520 | 330.733 |
| 29.549 | −38.854 | 330.733 |
| 29.725 | −39.105 | 330.733 |
| 29.860 | −39.320 | 330.733 |
| 29.850 | −39.522 | 330.733 |
| 29.757 | −39.643 | 330.733 |
| 29.617 | −39.703 | 330.733 |
| 29.420 | −39.660 | 330.733 |
| 29.246 | −39.472 | 330.733 |
| 29.048 | −39.237 | 330.733 |
| 28.784 | −38.923 | 330.733 |
| 28.440 | −38.515 | 330.733 |
| 28.010 | −38.005 | 330.733 |
| 27.488 | −37.386 | 330.733 |
| 26.867 | −36.648 | 330.733 |
| 26.141 | −35.784 | 330.733 |
| 25.285 | −34.761 | 330.733 |
| 24.298 | −33.580 | 330.733 |
| 23.183 | −32.240 | 330.733 |
| 21.939 | −30.739 | 330.733 |
| 20.571 | −29.075 | 330.733 |
| 19.083 | −27.245 | 330.733 |
| 17.542 | −25.326 | 330.733 |
| 15.953 | −23.315 | 330.733 |
| 14.319 | −21.207 | 330.733 |
| 12.646 | −19.001 | 330.733 |
| 10.938 | −16.692 | 330.733 |
| 9.198 | −14.277 | 330.733 |
| 7.434 | −11.755 | 330.733 |
| 5.707 | −9.209 | 330.733 |
| 4.017 | −6.639 | 330.733 |
| 2.362 | −4.047 | 330.733 |
| 0.51111 | −1.436 | 330.733 |
| −0.866 | 1.190 | 330.733 |
| −2.449 | 3.829 | 330.733 |
| −4.017 | 6.476 | 330.733 |
| −5.574 | 9.131 | 330.733 |
| −7.122 | 11.791 | 330.733 |
| −8.660 | 14.456 | 330.733 |
| −10.189 | 17.127 | 330.733 |
| −11.654 | 19.716 | 330.733 |
| −13.055 | 22.223 | 330.733 |
| −14.391 | 24.649 | 330.733 |

TABLE I-continued

| X | Y | Z |
|---|---|---|
| −15.663 | 26.993 | 330.733 |
| −16.868 | 29.256 | 330.733 |
| −18.007 | 31.439 | 330.733 |
| −19.079 | 33.541 | 330.733 |
| −20.081 | 35.563 | 330.733 |
| −20.968 | 37.413 | 330.733 |
| −21.743 | 39.089 | 330.733 |
| −22.409 | 40.590 | 330.733 |
| −23.011 | 42.006 | 330.733 |
| −23.513 | 43.242 | 330.733 |
| −23.882 | 44.199 | 330.733 |
| −24.157 | 44.973 | 330.733 |
| −24.342 | 45.560 | 330.733 |
| −24.469 | 46.004 | 330.733 |
| −24.522 | 46.255 | 330.733 |
| −24.528 | 46.418 | 330.733 |
| −24.509 | 46.498 | 330.733 |
| −24.486 | 46.532 | 330.733 |

At the same time, each blade 10 therefore has an aerodynamic profile which allows a high conversion efficiency and a high useful life to be maintained.

Furthermore, the aerodynamic profile of the blade 10 according to the invention is obtained with the values of Table 1 by piling up the series of closed curves and grouping them so as to obtain a continuous aerodynamic profile.

In order to take into account the dimensional variability of each blade 10, the profile of each blade 10 can have a tolerance of +/−2 mm in a normal direction with respect to the profile of the blade 10 itself.

The profile of each blade 10 can also comprise a coating, applied subsequently and which varies the profile itself.

Said antiwear coating preferably has a thickness defined in a normal direction at each surface of the blade 10 and ranging from 0 to 0.5 mm.

It is evident, moreover, that the values of the coordinates of Table 1 can be multiplied or divided by a corrective constant to obtain a profile in a greater or smaller scale, maintaining the same form.

According to another aspect of the present invention, a rotor of a second stage of a compressor is provided, which comprises a series of blades 10 of the type described above, each of which having a shaped aerodynamic profile, which are fixed to an outer surface of said rotor so as to be uniformly distanced thereon, and also oriented so as to confer a high efficiency to the compressor in which said rotor is preferably inserted.

According to another aspect of the present invention, a compressor is provided, comprising a rotor of the type described above.

It can thus be seen that a blade of a rotor of a second stage of a compressor according to the present invention achieves the objectives specified above.

The rotor blade of a second stage of a compressor of the present invention thus conceived, can undergo numerous modifications and variants, all included in the same inventive concept.

Furthermore, in practice, the materials used, as also the dimensions and components, can vary according to technical requirements.

What is claimed is:

1. A blade of a rotor of a second stage of a compressor, which can be defined by coordinates of a discreet combination of points, in a Cartesian reference system (X, Y, Z), wherein the axis (Z) is a radial axis intersecting the central axis of the compressor, said blade having an aerodynamic profile which can be identified by a series of closed intersection curves between the profile itself and planes (X, Y) lying at distances (Z) from the central axis, said blade comprising:

a base portion fixable to the rotor, the aerodynamic profile identified by a first substantially concave surface, which is pressurized, and a second substantially convex surface which is in depression and which is opposite to the first concave surface, said two surfaces being continuous and joined to each other to form the aerodynamic profile of said blade extending from a foot at said base portion to a free end of said blade distal from said base portion, wherein each closed curve substantially parallel to said base portion has a maximum thickness determined by a maximum distance between said first surface and said second surface, said maximum thickness of each closed curve, along the height of the blade in the direction of the free end of the blade, having a non-linearly variable trend decreasing at a higher rate from said base portion to a first predetermined height, then at a lower rate from the first predetermined height to a second predetermined height, said variable trend of maximum thickness halfway up the blade being suitable for shifting one or more natural resonance frequencies of the blade itself outside a functioning velocity range of said rotor.

2. The blade according to claim 1, wherein along the height of the blade in the direction of its free end, said maximum thickness has a trend according to a polynomial function of the sixth degree.

3. The blade according to claim 2, wherein said polynomial function of the sixth degree is:

$$T\text{max}=-21.119*h^6+70.467*h^5-85.603*h^4+44.523*h^3-7.8323*h^2-1.1541*h+0.997$$

wherein h represents the percentage of the height of the blade, and wherein Tmax is the maximum adimensionalized thickness relating to the closed curve corresponding to that percentage of the height of the blade.

4. The blade according to claim 1, wherein the profile of said blade comprises an antiwear coating.

5. The blade according to claim 4, wherein said coating has a thickness ranging from 0 mm to 0.5 mm.

6. A rotor of a second stage of a compressor, wherein the rotor comprises:

a series of blades according to claim 1.

7. The rotor according to claim 6, wherein said series of blades constrained to an outer surface of said rotor and said series of blades is also uniformly distributed thereon in order to maximize the efficiency of the rotor itself.

8. A compressor comprising a rotor according to claim 6.

9. The blade according to claim 1, wherein said first predetermined height is about 25% of the height of the blade.

10. The blade according to claim 9, wherein said second predetermined height is above about 50% of the height of the blade.

11. The blade according to claim 10, further comprising said maximum thickness of each closed curve variable trend decreasing at a higher rate from said second predetermined height to a third predetermined height than the rate from the first predetermined height to the second predetermined height.

12. The blade according to claim 11, further comprising said maximum thickness of each closed curve variable trend decreasing at a lower rate from said third predetermined height to the free end than the rate from the second predetermined height to the third predetermined height.

13. The blade according to claim 1, wherein said second predetermined height is above about 50% of the height of the blade.

14. A blade of a rotor of a compressor, which can be defined by coordinates of a discreet combination of points, in a Cartesian reference system (X, Y, Z), wherein the axis (Z) is a radial axis intersecting the central axis of the compressor, said blade having an aerodynamic profile which can be identified by a series of closed intersection curves between the profile itself and planes (X, Y) lying at distances (Z) from the central axis, said blade comprising:

a base portion fixable to the rotor, the aerodynamic profile identified by a first substantially concave surface, which is pressurized, and a second substantially convex surface which is in depression and which is opposite to the first, said two surfaces being continuous and joined to each other to form the aerodynamic profile of said blade extending from a foot at said base portion to a free end of said blade distal from said base portion, said closed curves defined according to Table I, whose values, expressed in millimeters, refer to a profile at room temperature.

15. The blade according to claim 14, wherein the aerodynamic profile of said blade has a tolerance of +/−2 mm in a normal direction with respect to the profile of the blade itself.

16. A blade of a rotor of a compressor, which can be defined by coordinates of a discreet combination of points, in a Cartesian reference system (X, Y, Z), wherein the axis (Z) is a radial axis intersecting the central axis of the compressor, said blade having a profile which can be identified by means of a series of closed intersection curves between the profile itself and planes (X, Y) lying at distances (Z) from the central axis, said blade comprising said closed curves defined according to Table I, whose values, expressed in millimeters, refer to a profile at room temperature.

17. The blade according to claim 16, wherein the profile of said blade has a tolerance of +/−2 mm in a normal direction with respect to the profile of the blade itself.

18. The blade according to claim 16 wherein the values of the coordinates of Table I are multiplied by a corrective constant to obtain a scaled profile maintaining the same form.

19. A rotor of a second stage of a compressor, the rotor comprising a series of blades according to claim 16.

20. A blade of a rotor of a compressor, said blade having a profile which can be identified by a series of closed intersection curves between the profile itself and planes substantially perpendicular to a central axis of the blade, said blade comprising:

a base portion fixable to the rotor; and a blade portion connected with a first end to the base portion and having a second end free standing, wherein the aerodynamic profile is identified by a first substantially concave surface, and a second substantially convex surface which is opposite to the first concave surface, said two surfaces being continuous and joined to each other to form the aerodynamic profile of said blade extending from a foot at said base portion to the second end of said blade distal from said base portion, wherein each closed curve is substantially parallel to said base portion and has a maximum thickness determined by a maximum distance between said first surface and said second surface, said maximum thickness of each closed curve, along the height of the blade in the axial direction of the blade, having a non-linearly variable trend decreasing at a higher rate from said base portion to a first predetermined height, then at a lower rate from the first predetermined height to a second predetermined height, and the second predetermined height being substantially half of the height of the blade.

* * * * *

UNITED STATES PATENT AND TRADEMARK OFFICE

CERTIFICATE OF CORRECTION

PATENT NO. : 7,785,074 B2
APPLICATION NO. : 11/675969
DATED : August 31, 2010
INVENTOR(S) : Novori et al.

It is certified that error appears in the above-identified patent and that said Letters Patent is hereby corrected as shown below:

On Page 2, item (56), under "U.S. PATENT DOCUMENTS", in Column 2, Line 3, delete "Jarra" and insert -- Jarrah --, therefor.

In Column 1, Line 47, delete "phase" and insert -- stage --, therefor.

In Column 3, Line 3, delete "wherein" and insert -- whereas --, therefor.

In Column 3, Line 30, delete "1," and insert -- I, --, therefor.

In Column 28, Line 26, delete "1" and insert -- I --, therefor.

In Column 28, Line 38, delete "1" and insert -- I --, therefor.

Signed and Sealed this
First Day of February, 2011

David J. Kappos

David J. Kappos
*Director of the United States Patent and Trademark Office*